(12) United States Patent
Johnson

(10) Patent No.: US 6,286,795 B1
(45) Date of Patent: Sep. 11, 2001

(54) DUAL-STAGE QUICK RELEASE LEG AND TRIPOD

(75) Inventor: Joel W. Johnson, Newport Beach, CA (US)

(73) Assignee: Autocue, Inc., New York, NY (US)

( * ) Notice: Subject to any disclaimer, the term of this patent is extended or adjusted under 35 U.S.C. 154(b) by 0 days.

(21) Appl. No.: 09/509,962

(22) PCT Filed: Oct. 20, 1998

(86) PCT No.: PCT/US98/22140

§ 371 Date: Apr. 3, 2000

§ 102(e) Date: Apr. 3, 2000

(87) PCT Pub. No.: WO99/20933

PCT Pub. Date: Apr. 29, 1999

(51) Int. Cl.[7] .................................................. F16M 11/00
(52) U.S. Cl. ..................... 248/168; 248/169; 248/170; 248/163.1; 248/166; 248/177.1; 248/188
(58) Field of Search .............................. 248/163.1, 166, 248/168, 170, 440, 177.1

(56) References Cited

U.S. PATENT DOCUMENTS

| | | |
|---|---|---|
| 1,358,402 | 11/1920 | Thalhammer . |
| 1,840,556 | 1/1932 | Arnold . |
| 2,204,013 | 6/1940 | Gaidos ................................. 248/168 |
| 4,324,477 * | 4/1982 | Miyazaki ............................ 354/293 |
| 4,840,338 | 6/1989 | O'Connor ............................ 248/168 |
| 4,872,627 | 10/1989 | O'Connor ............................ 248/677 |
| 5,062,606 | 11/1991 | Hoshino ............................... 248/171 |
| 5,178,352 * | 1/1993 | Johnson ............................... 248/181 |
| 5,253,833 * | 10/1993 | Indou ................................... 248/168 |
| 5,503,357 * | 4/1996 | Johnson et al ..................... 248/188.5 |
| 5,887,835 * | 3/1999 | Hein et al. ........................... 248/161 |
| 6,082,685 * | 6/2000 | Hein et al. ........................... 248/161 |

FOREIGN PATENT DOCUMENTS

| | | |
|---|---|---|
| 197801 | 5/1923 | (GB) . |
| 290180 | 11/1928 | (GB) . |
| 750630 | 6/1956 | (GB) . |
| 1127497 | 9/1968 | (GB) . |
| 2262306 | 6/1993 | (GB) . |

* cited by examiner

Primary Examiner—Leslie A. Braun
Assistant Examiner—Steven Marsh
(74) Attorney, Agent, or Firm—Leydig, Voit & Mayer, Ltd.

(57) ABSTRACT

A leg for a dual stage tripod including a mechanism for actuating the lower lock assembly from the upper end of the leg. The leg includes telescoping upper (46), middle (48), and lower (50) leg portions, and upper and lower lock assemblies for coupling the upper and middle leg portions together, and the middle and lower leg portions together, respectively. An elongated torque shaft (270) extends substantially parallel the upper leg portion, downward from the upper end of the leg to a transfer assembly coupled to the upper end of the middle leg portion. The transfer assembly is coupled to the lower lock assembly disposed at the lower end of the middle leg portion such that rotation of the torque shaft about its longitudinal axis results in an actuating force which actuates the lower lock assembly.

32 Claims, 14 Drawing Sheets

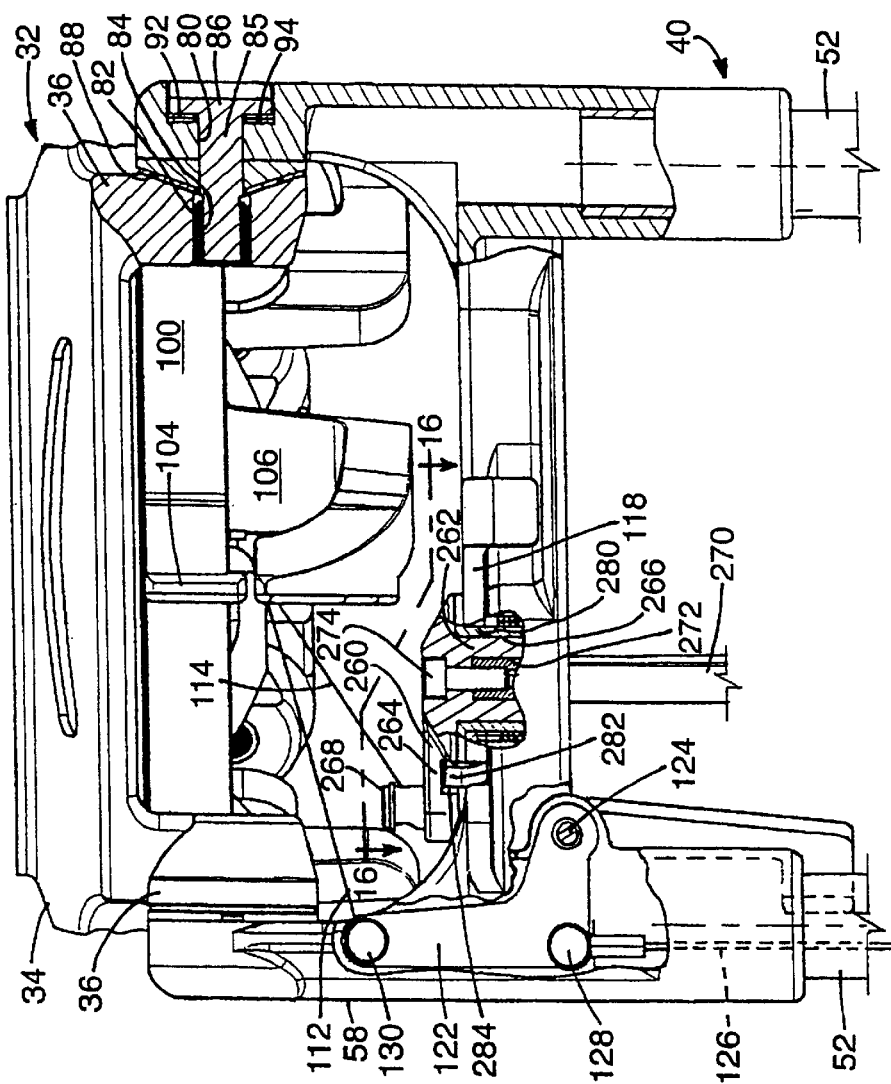
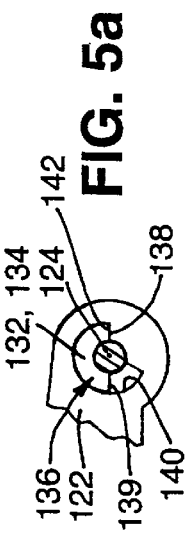
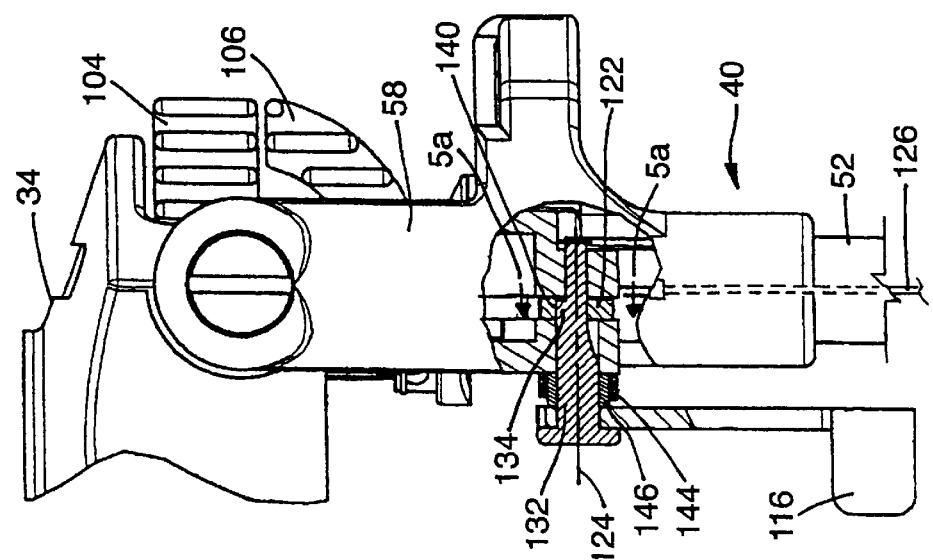
FIG. 4
FIG. 5a
FIG. 5

DUAL-STAGE QUICK RELEASE LEG AND TRIPOD

FIELD OF THE INVENTION

The invention relates to equipment support tripods, and more particularly concerns dual-stage adjustable length tripod legs.

BACKGROUND OF THE INVENTION

Various types of tripods exist for supporting cameras or other equipment during use. Single stage tripods include legs which have two portions which telescope relative to one another to adjust the total length of the leg, while dual stage tripods include legs having three telescoping portions. Although single stage tripods are more versatile than non-adjustable tripods, dual stage tripods provide an added level of control and adjustability over single stage tripods.

The separate, telescoping portions of a leg are coupled together by a lock assembly to prevent relative movement when the supported equipment is in a desired position. The lock assembly is generally secured to the end of one leg portion and slidingly engages the second leg portion. For example, the lock assembly of a single stage tripod leg is typically secured to the lower end of the upper leg portion, and slidingly receives the lower leg portion. When the telescoping leg portions reach their desired position, the lock assembly is engaged to couple the upper and lower leg portions together to prevent any further movement.

While various types of lock assemblies exist for securing the leg portions together, they typically include elements that either clamp the leg portions together using a substantially horizontally exerted force, physically engage an opening in one of the leg portions, or both. The lock assembly may be actuated by a knob or a lever disposed substantially adjacent the lock assembly itself. Alternately, in single stage tripods, the legs may be remotely actuated. This allows the user to readily adjust the leg locks while stabilizing the tripod head. For example, in U.S. Pat. No. 4,840,338 to O'Connor, the lock assembly secured to the lower end of the upper leg portion of a single stage tripod is actuated by means of a cable which runs from the lock assembly to the head of the tripod. An upward actuating force is exerted on the cable by means of either a rotating ring or collar, or an actuating lever which force is further transmitted onward to the lock assembly. This remote actuation is possible because the relative distance between the upper end of the tripod leg and the lock mechanism secured to the lower end of the upper portion of the leg remains constant even during telescoping movement.

With a dual stage tripod, however, the distance between the lower lock assembly (which couples the middle and lower leg portions) and the upper end of the tripod leg does not remain substantially constant. Rather, as the upper and middle leg portions telescope, the distance between the lower lock assembly and the upper end of the leg necessarily changes. Accordingly, prior art methods of remote activation may not be used with the lower locks of a dual stage tripod. As a result, dual stage tripods are not so readily utilized or quickly set up because the user must stabilize the tripod head in a desired position while reaching down to secure each of the locks of each of the legs.

OBJECTS OF THE INVENTION

It is a primary object of the invention to provide a tripod which is easy to use and is fully adjustable from the head thereof. A more particular object is to provide a dual stage tripod with adjustable length legs wherein leg length adjustment can be made while an operator is gripping and controlling the tripod head with an instrument attached.

An additional object is to provide a dual stage tripod wherein the user may adjust any or all of the leg locks from the head of the tripod. A more particular object of the invention is to provide a dual stage leg wherein the lower lock assembly which secures the middle and lower leg portions may be adjusted from the upper end of the leg.

Another object of the invention is to provide a dual stage tripod wherein the lower lock of each of the legs may be actuated simultaneously. A related object is to provide a dual stage tripod wherein the lower lock of each of the legs may be actuated individually.

A further object of the invention is to provide a dual stage tripod wherein the upper lock of each of the legs may likewise be actuated simultaneously or the upper lock of a select leg may be actuated individually.

BRIEF SUMMARY OF THE INVENTION

In accomplishing these and other objects of the invention, there is provided a dual stage tripod wherein the lock assemblies of each of the legs may be operated from the tripod head. More specifically, the tripod includes a dual stage leg having means for actuating the lower lock from the upper end of the leg.

As with conventional dual stage legs, the leg includes upper, middle and lower leg portions, and upper and lower lock assemblies for coupling the upper and middle leg portions together, and the middle and lower leg portions together, respectively. A dual stage leg constructed in accordance with teachings of the invention further includes a torque shaft which extends from the upper end of the leg to a transfer assembly disposed at the upper end of the middle leg portion. The transfer assembly slides longitudinally along the torque shaft as the upper and middle leg portions telescope relative to one another. Rotation of the torque shaft about its longitudinal axis actuates the transfer assembly to result in a lower lock actuating force. This force is then transmitted from the upper end of the middle leg portion to the lower lock assembly disposed at the lower end of the middle leg portion to actuate the lower lock assembly. Accordingly, the user may actuate the lower lock assembly to couple or uncouple the lower lock assembly by rotating the torque shaft at the upper end of the leg.

According to another feature of invention, the user may actuate the lower lock assembly of each leg individually, or actuate the lower lock of each leg simultaneously. To actuate the lower lock assembly of an individual leg, the user may preferably directly rotate an associated torque shaft by pivoting a crank coupled to the upper end of the torque shaft.

Alternately, the user may rotate the torque shaft of each of the legs by means of a lower lock ring disposed subjacent the head of the tripod. The lower lock ring is coupled to the crank of each of the legs by means of a flexible cable or the like, such that when the user rotates the ring, the ring exerts a force on the individual cables to pivot the crank and rotate the torque shaft associated with each individual leg. In this way, the rotation of the lower lock ring actuates the lower lock assembly of each leg substantially simultaneously.

Accordingly to yet another feature of the invention, the user may likewise actuate the upper lock assemblies either individually or substantially simultaneously. The upper lock assembly is preferably coupled to the lower end of the upper leg portion and slidingly receives the middle leg portion.

The upper lock assembly preferably is actuated by a cable which extends from a bell crank disposed at the upper end of the leg to the lock assembly disposed at the lower end of the upper leg portion. Accordingly, pivoting of the bell crank exerts an upward actuating force on the cable.

The upper lock assembly of an individual leg may be actuated by pivoting the bell crank of an individual leg. Alternately, the bell crank of each leg may be pivoted simultaneously by means of an upper lock ring to actuate the upper lock assembly of each leg substantially simultaneously. As with the lower lock ring, the upper lock ring is disposed subjacent the tripod head and preferably is coupled to the bell crank of each individual leg by means of cables. Accordingly, by rotating the upper lock ring, the user pivots the bell crank of each individual leg to actuate the upper lock assembly of each of the legs substantially simultaneously. Moreover, by rotating both the upper and lower lock rings concurrently, the user may actuate all of the lock mechanisms of the tripod substantially simultaneously.

In this way, during set up of the tripod, the user may hold the camera or other equipment mounted to the head of the tripod in the desired position and merely rotate the upper and lower lock rings to release the locks of the legs. The legs will then telescope to the ground under the force of gravity. The user then releases the lock rings which rotate back to their original position, and the legs lock. The user may then fine tune the legs as desired by actuating the individual lock mechanisms by pivoting the crank or bell crank associated with an individual lock mechanism of an individual leg.

These and other features and advantages of the invention will be more readily apparent upon reading the following description of a preferred exemplified embodiment of the invention and upon reference to the accompanying drawings wherein:

BRIEF DESCRIPTION OF THE DRAWINGS

FIG. 4 is a fragmentary plan view of the front of the tripod head with a leg attached thereto partially broken away to show the attachment of the upper leg bracket to the casting lug, and the cranks for actuation of the upper lock assembly and the transfer assembly.

FIG. 5 is a fragmentary plan view of the side of the tripod shown in FIG. 4 broken away to show the attachment of the upper lock release lever.

FIG. 5a is an enlarged fragmentary view taken along line 5a—5a in FIG. 5.

While the invention will be described in connection with certain preferred embodiments, there is no intent to limit it to those embodiments. On the contrary, the intent is to cover all alternatives, modifications, and equivalents included within the spirit and scope of the invention as defined by the appended claims.

DESCRIPTION OF THE PREFERRED EMBODIMENT

Figure 1:
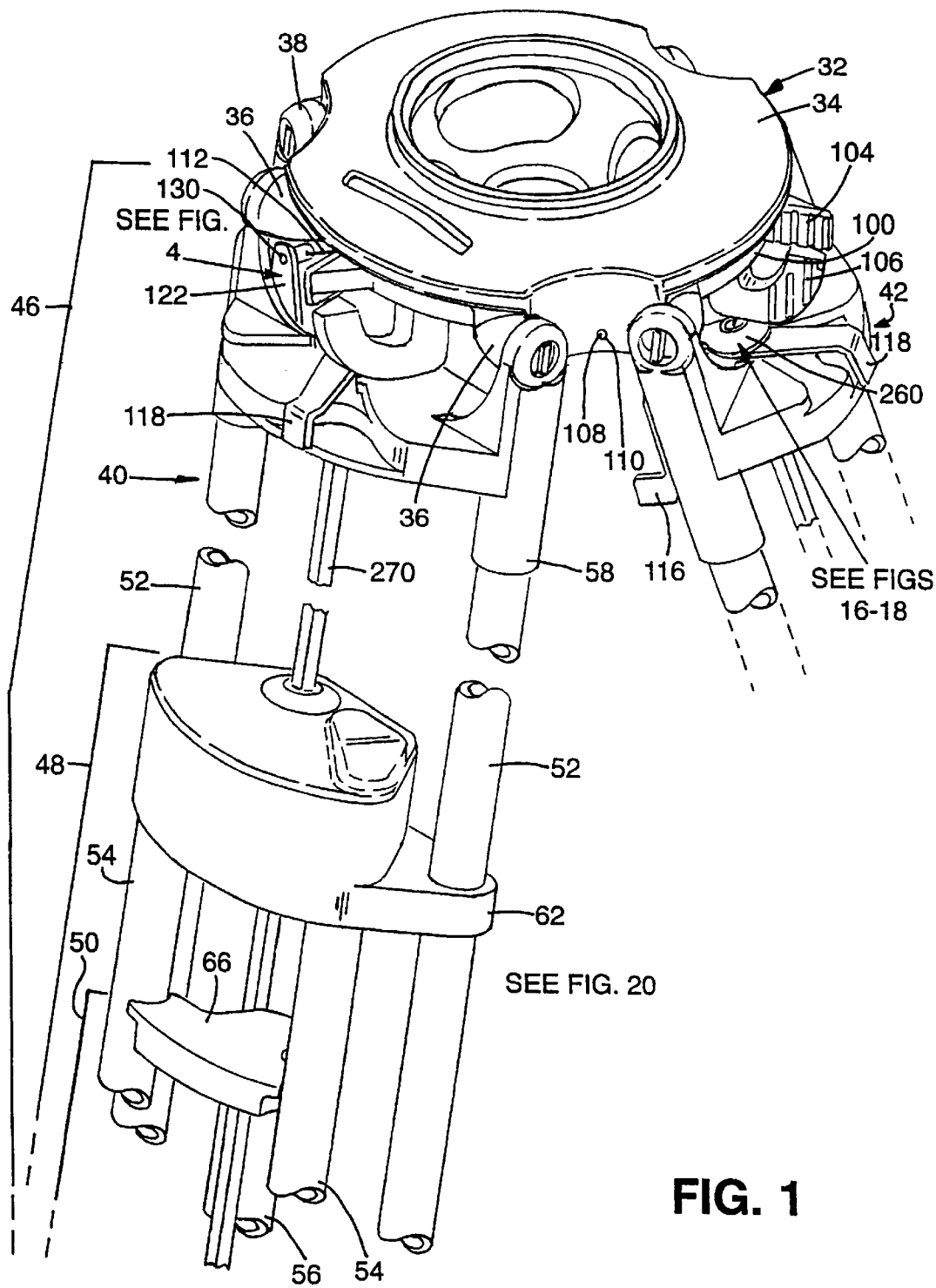
FIG. 1 is a fragmentary perspective view of a tripod head constructed in accordance with teachings of the invention

Turning now to the drawings, there is shown in FIG. 1, a fragmentary view of the upper portion of a tripod 30 constructed in accordance with teachings of the invention. The tripod 30 has a head 32 which includes a casting 34 having pairs of lugs 36 on which three legs 38, 40, 42 are pivotably coupled (fragmentary views of the legs are shown). In order to maintain the spaced relative positions of the legs 38, 40, 42 when the tripod 30 is in the open position shown in FIG. 1, a tripod spreader 44 (shown in FIG. 2) is provided. The spreader 44 includes three arms 45 which are coupled to respective legs of the tripod 30. The spreader itself will not be explained in greater detail herein. It will be appreciated, however, that any appropriate spreader design may be utilized.

As preferably all three legs 38, 40, 42 are similarly constructed, only the leg 40 will be described in detail (see FIGS. 1, 2, and 3). The leg 40 includes two stages, that is, elongated upper (see FIGS. 1 and 2), middle (see FIGS. 1 and 3), and lower leg portions 46 (see FIGS. 1 and 3), 48, 50 which are slidingly coupled so that they may telescope inward to achieve minimum leg length or outward to achieve a maximum leg length. It will thus be appreciated that each leg has two stages of telescoping movement, that is the telescoping of the upper and middle portions 46, 48, and the telescoping of the middle and lower portions 48, 50.

The upper and middle leg portions 46, 48 each preferably include two tubes 52, 54, and the lower leg portion 50 one elongated tube 56, which are formed of a rigid material such as an extruded metal. It will be appreciated, however, that the tubes 52, 54, 56 may be formed of an alternate material or comprise an alternate cross-section, such as, for example, a generally rectangular cross-section.

Figure 2:
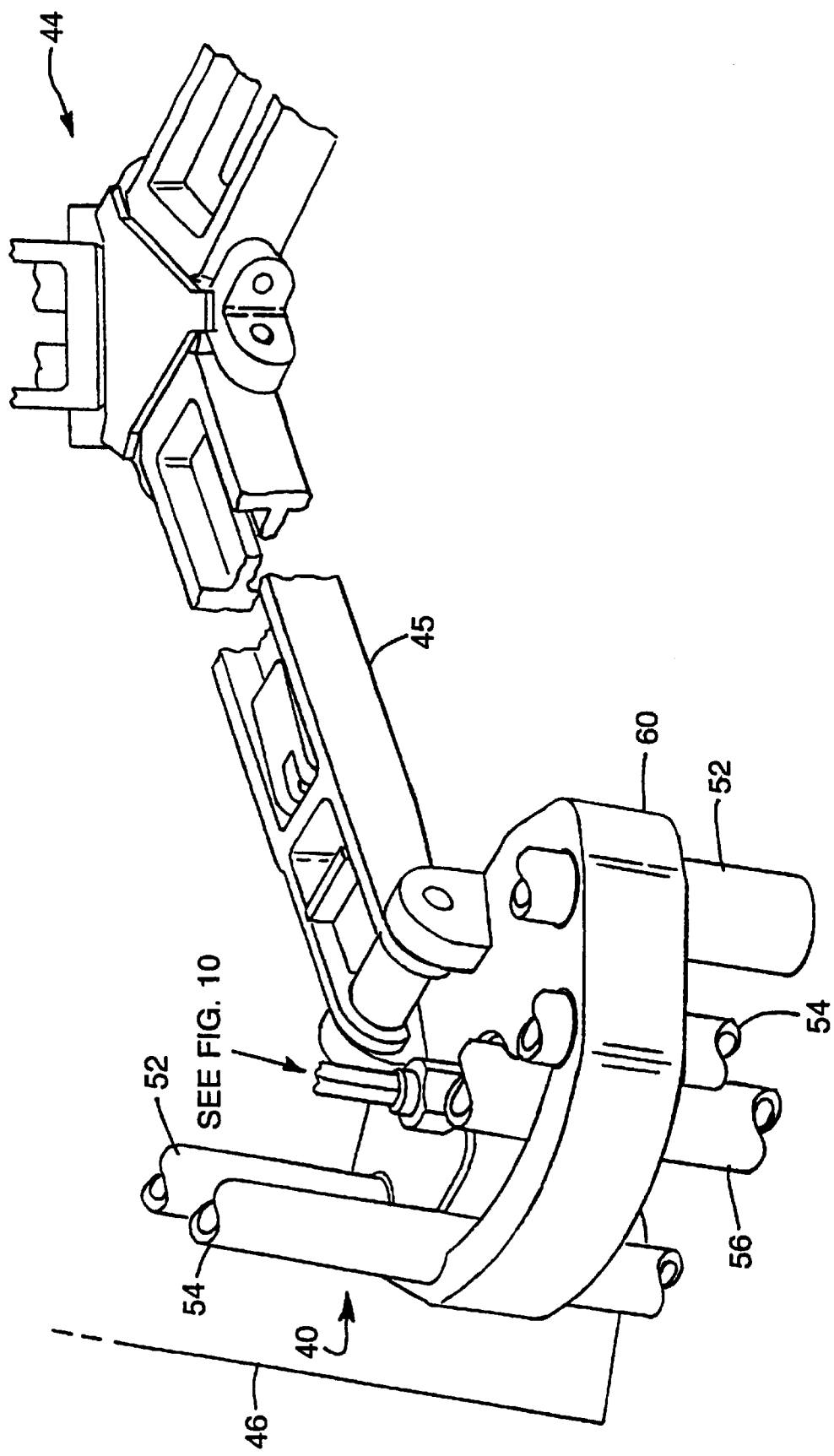
FIG. 2 is a fragmentary perspective view of a leg spreader coupled to one leg of the tripod of FIG. 1.

The tubes 52 of the upper leg portion 46 are maintained in their relative positions by an upper bracket 58 and an upper housing guide 60, to which the tubes are secured at their upper and lower ends, respectively (see FIGS. 1 and 2). Similarly, the tubes 54 of the middle leg portion 48 are maintained in their relative positions by a transfer housing 62 to which the tubes 54 are secured at their upper ends, and a lower housing guide 64 to which the tubes 54 are secured at their lower ends (see FIGS. 1 and 3).

The tubes 54 of the middle leg portion 48 are slidably disposed within the upper housing guide 60 (see FIG. 2) secured to the lower end of the upper tubes 52. In the embodiment shown, the tubes 52 of the upper leg portion 46 are also slidably disposed within openings in the transfer housing 62. In this way, the tubes 54, 56 may telescope relative to one another to adjust the length of the leg 40.

To maintain the relative telescoped positions of the upper and lower leg portions 46, 48, the leg 40 is further provided with an upper lock assembly 70, which is disposed within the upper housing guide 60, and may be used to secure together the upper and middle leg portions 46, 48. The structure of the upper lock assembly 70 (shown in FIGS. 10–15) and its operation will be explained in greater detail below.

Figure 3:
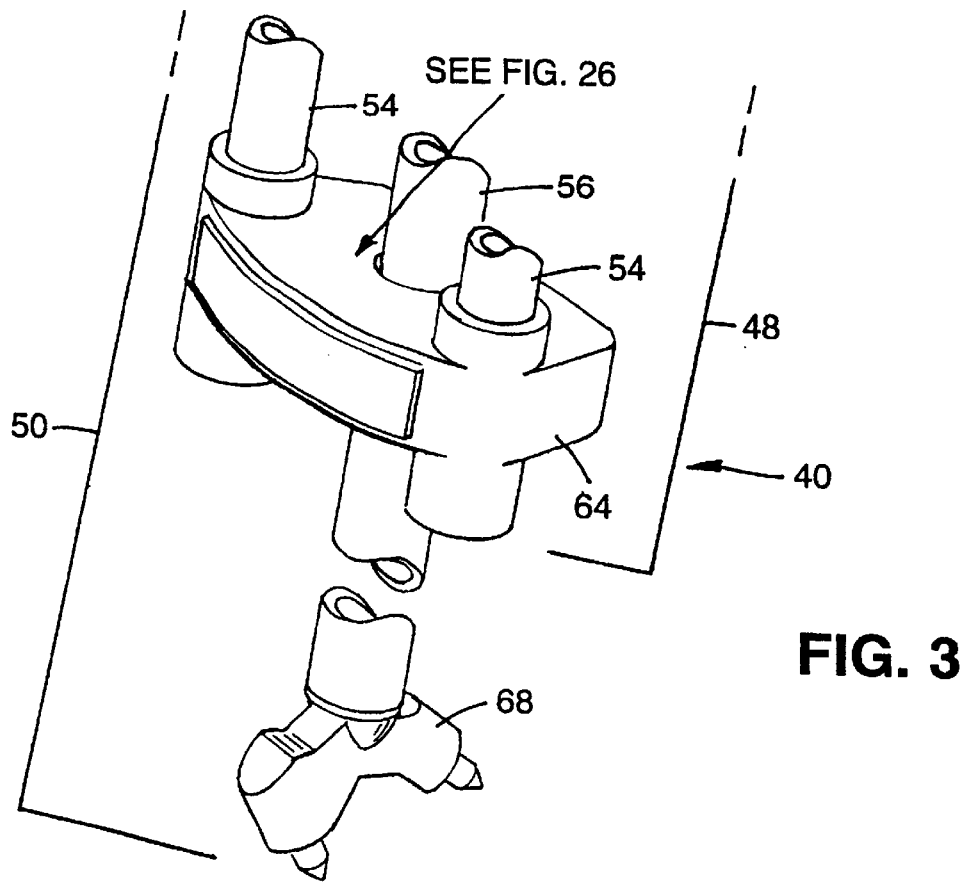
FIG. 3 is a fragmentary perspective view of the lower housing guide and the end of a leg of the tripod of FIG. 1.

Similarly, the elongated tube 56 of the lower leg portion 50 is slidably disposed within the lower housing guide 64 (see FIG. 3). To maintain the relative telescoped positions of the middle and lower leg portions 48, 50, the leg 40 likewise is provided with a lower lock assembly 72, which is disposed within the lower housing guide 64. The structure of the lower lock assembly (illustrated in FIGS. 25 and 26) and its operation will also be explained in greater detail below.

It will thus be appreciated that inasmuch as the tubes 52, 54, 56 slide relative to one another through attached housings 60, 62, 64, the tubes 52, 54, 56 preferably have uniform cross section over the leg adjustment range for which the leg 40 may telescope.

To prevent the lower leg portion 50 from becoming disengaged from the lower housing guide 64, as by sliding through the lower housing guide 64, the elongated tube 56 of the lower leg portion 50 is provided at its upper end with a lower leg cap 66 (see FIGS. 1 and 3). The lower end of the lower leg portion 50 further is provided with a conventional pointed fitting 68 for engaging the ground (see FIG. 3).

As may be seen in FIG. 4, the leg 40 is coupled to the casting 34 at the upper bracket 58. The bracket 58 and the lugs 36 have axially aligned bores 80, 82, the lug bore 82 including a threaded insert 84. A bolt 85 is fed through the threaded insert 84, the head 86 of the bolt 85 being disposed along the surface of the bracket 58 opposite the lug 36. To enhance stability of the tripod, the surface of the lug 36 adjacent the upper bracket 58 has a concave shape, and a cone-shaped washer 88 is provided between the surfaces of the lug 36 and the bracket 58. It will be appreciated by those skilled in the art that the cone-shaped washer 88 when properly tightened will eliminate or minimize radial slop in the joint between the bracket 58 and the casting 34. Washers 92, 94 may likewise be provided.

In accordance with the invention, the upper and lower lock assemblies 70, 72 may be controlled from the upper end of the leg 40, with the control making it possible to (a) release the lock assemblies 70, 72 of each leg 38, 40, 42 individually, (b) all of the upper lock assemblies 70 simultaneously, (c) all of the lower lock assemblies 72 simultaneously, or (d) both the upper and lower lock assemblies 70, 72 simultaneously.

Figure 6:
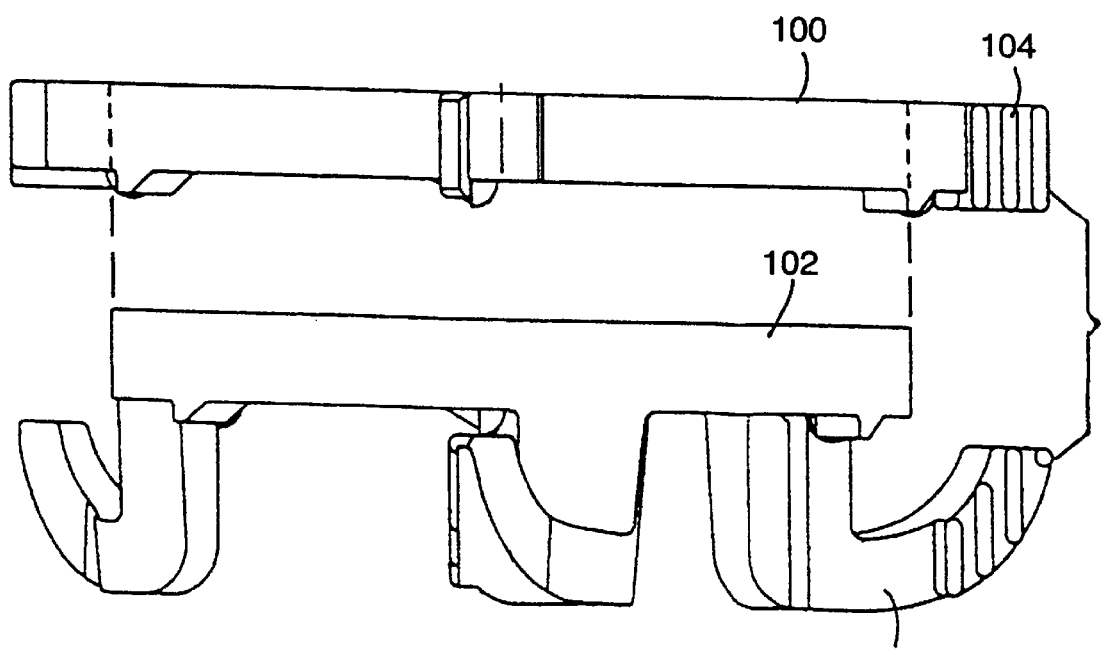
FIG. 6 is a schematic plan view of the nesting upper and lower lock rings.
Figure 7:
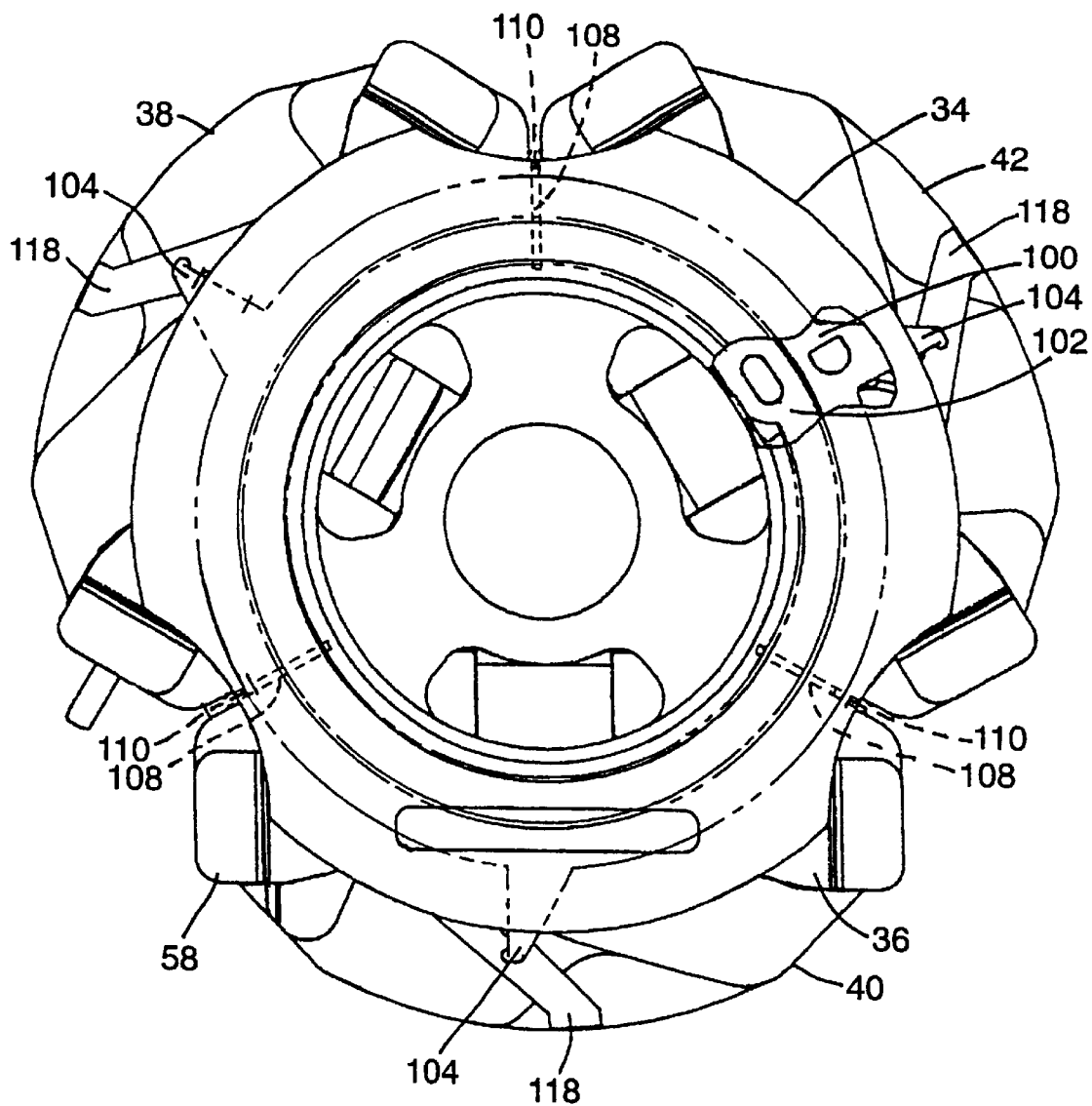
FIG. 7 is an elevated view of the tripod.

In carrying out the invention, the tripod 30 is provided with upper and lower lock rings 100, 102 which are disposed subjacent the casting 34, as shown in FIGS. 1, 4, 5 and 7. As schematically illustrated in FIG. 6, the upper and lower lock rings 100, 102 are also concentrically disposed, the lower lock ring 102 nesting within the upper lock ring 100. The upper and lower lock rings 100, 102 are held in place within the upper casting 34 by three pins 108 which extend through bores 110 in the casting and protrude into the interior cavity of the casting 34, as may be seen in FIGS. 1 and 7. As means for rotating the lock rings 100, 102, generally adjacently disposed release tabs 104, 106 extend from the upper and lower lock rings 100, 102, respectively, for actuation of the upper and lower lock assemblies 70, 72.

As best seen in FIG. 4, the upper and lower lock rings 100, 102 are coupled to the upper and lower lock assemblies 70, 72, respectively, of each leg 38, 40, 42 by upper and lower lock ring cables 112, 114 and a series of elements, as will be explained below. Simultaneous rotation of both the upper and lower lock rings 102, 104 displaces both the upper lock ring cables 112 and the lower lock ring cables 114 and accordingly actuates both upper and lower lock assemblies 70, 72 of all three legs 38, 40, 42 substantially simultaneously.

Figure 8:
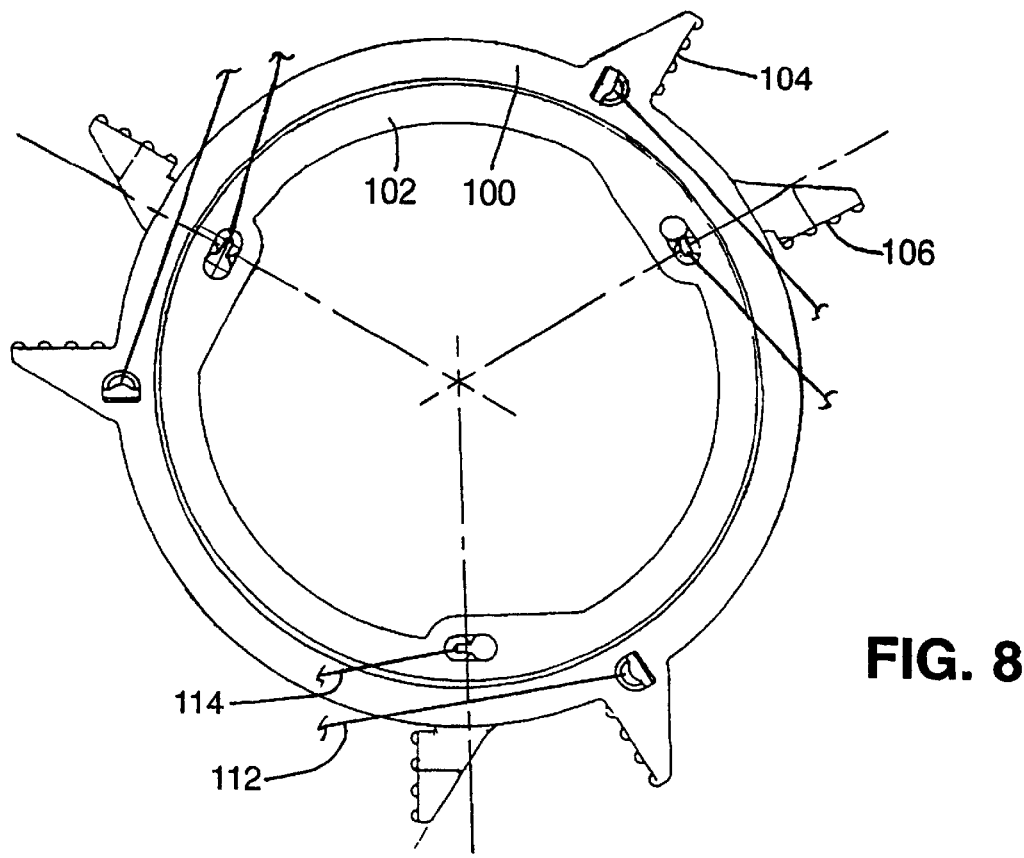
FIG. 8 is a schematic view of the bottom of the upper and lower lock rings wherein the upper lock ring has been rotated to actuate the upper lock assemblies of each leg simultaneously.
Figure 9:
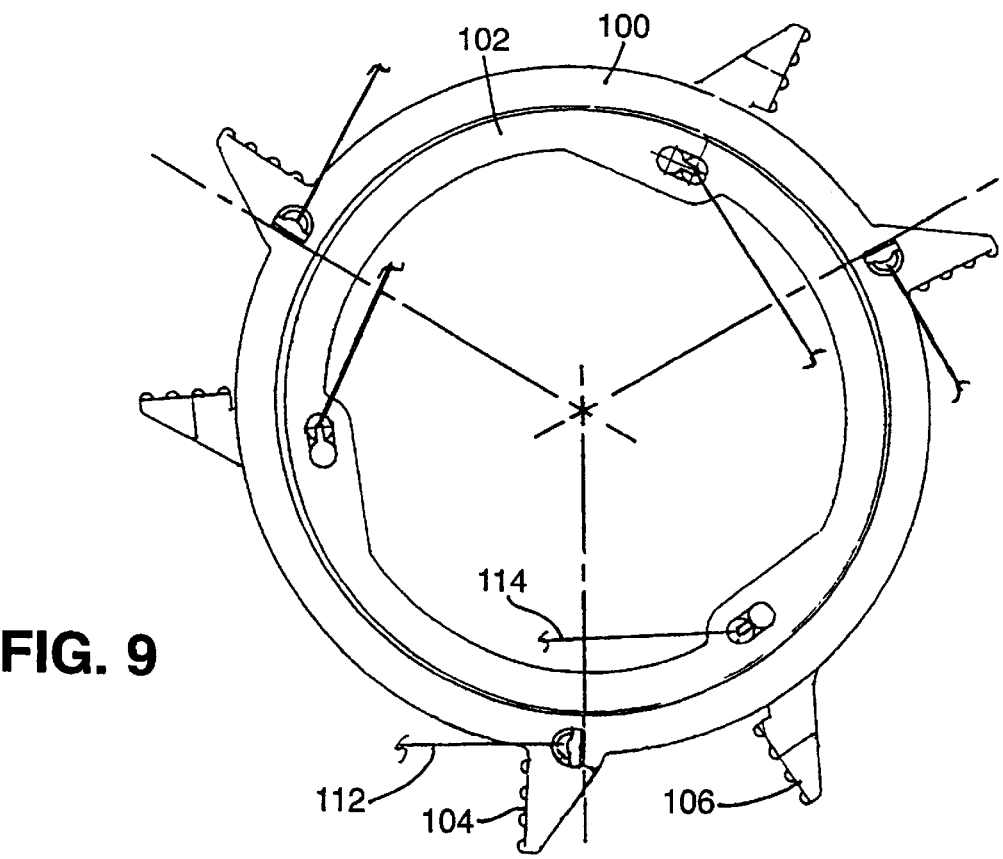
FIG. 9 is a schematic view of the bottom of the upper and lower lock rings wherein the lower lock ring has been rotated to actuate the lower lock assemblies of each leg simultaneously.

Alternately, rotation of only the upper lock ring 100, as shown in FIG. 8, displaces only the upper lock ring cables 112. In this way, the user may actuate only the upper lock assemblies 70 of the three legs 38, 40, 42, while the lower lock assemblies 72 are unaffected. Similarly, rotation of only the lower lock ring 104, as shown in FIG. 9, displaces only the lower lock ring cables 114, actuating only the lower lock assemblies 72 of the three legs 38, 40, 42.

According to another important feature of the invention, a user may likewise actuate the upper and lower lock assemblies 70, 72 of each leg 38, 40, 42 individually by rotation of upper and lower lock release levers 116, 118. The elements coupling the upper lock ring 100 and the upper lock release lever 116 to the upper lock assembly 70, and the elements coupling the lower lock ring 102 and lower lock release lever 118 to the lower lock assembly 72 will be separately described as they apply to leg 40. It will be appreciated, however, that, preferably, these elements will be substantially the same for each of the other two legs 38, 42.

Turning first to the actuation of the upper lock assembly 70, in order to transmit an actuating force or movement from the upper lock ring cable 112 to the upper lock assembly 70, a bell crank 122 is provided within the upper bracket 58, as shown in a broken away portion of FIG. 4. The upper bell crank 122 is generally "L-shaped" and is pivotally coupled to the upper bracket 58 at axis 124. An upper lock tube cable 126 is coupled to the bell crank 122 at cable pin 128 and extends downward through one of the upper tubes 62 to the upper lock assembly 70. The upper lock cable 112 is coupled to the upper bell crank 122 at cable pin 130, such that as the upper lock ring 100 rotates to the position shown in FIG. 8, the bell crank 122 pivots clockwise about axis 124 to raise the upper lock tube cable 126 to actuate the upper lock assembly 70. It will be appreciated that the cable pins 128, 130 allow cables 112, 126 to pivot relative to the upper bell crank 122.

In order actuate the upper lock assembly 70 of a given leg individually, the upper release lever 116 is coupled to the upper bell crank 122 by a cam pin 132, as shown in FIG. 5. The portion 134 of the cam pin 132 which engages the bell crank 122 has an arcuate upper surface 136 with substantially flat lower surfaces 138, 139, which extends through opening 140 in the upper bracket 58 (see FIG. 5a). As the lever 116 is rotated clockwise from the position shown in FIG. 4, the flat lower surface 138 of the cam pin 132 engages a surface 142 of the opening 140 to pivot the bell crank 122 clockwise. It will thus be appreciated that rotation of the lever 116 will raise the upper lock tube cable 126 to actuate the lower lock assembly 70 of an individual leg 40, as opposed to actuation of all the upper log assemblies 70 simultaneously. It will also be appreciated that when a user actuates all of the upper lock assemblies 70 simultaneously by rotating the upper lock ring 100, the extended arcuate shape of the opening 140 permits the bell crank 122 to pivot without displacing the cam pin 132 and the release lever 116. In order to bias the release lever 116 in the position shown in FIG. 5, a spring 144 and spacer 146 are disposed about the cam pin 132.

Figure 10:
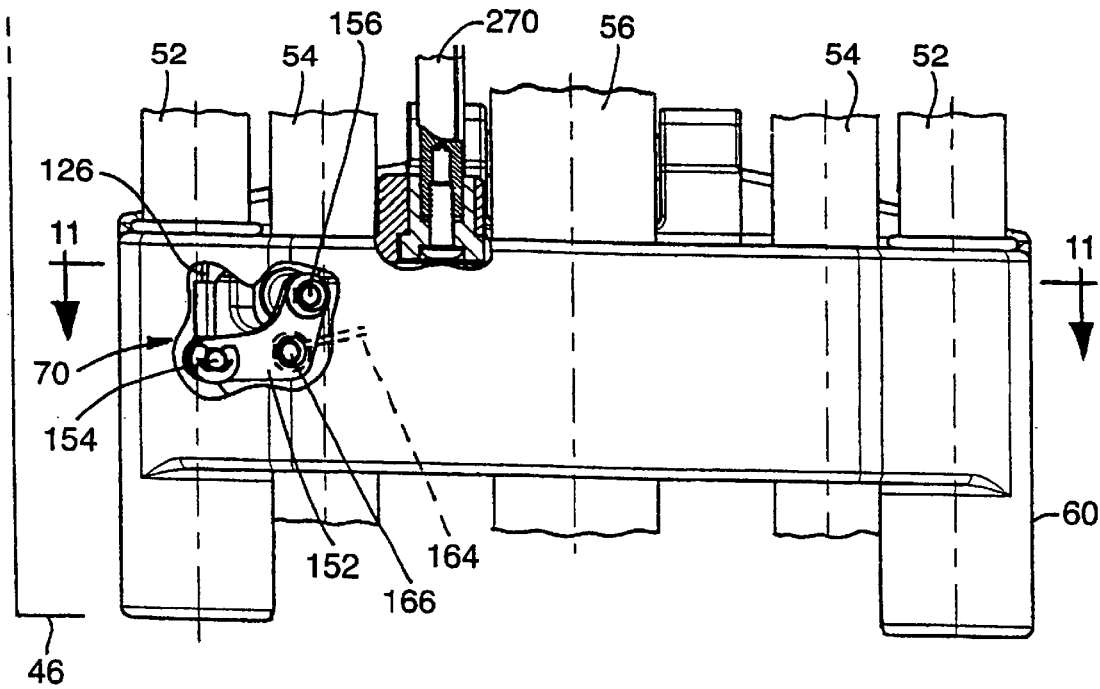
FIG. 10 is a plan view of the upper housing, partially broken away to show the lower bell crank and the lower lock torque shaft.

As may be seen in FIG. 10, the lower end of the upper lock tube cable 126 is coupled to a bell crank 152 (generally referred to as the upper lock lower bell crank) at cable pin 154. The upper lock lower bell crank 152 has a similar "L-shape" to that of the upper lock upper bell crank 122. The upper lock lower bell crank 152 is coupled to the upper housing at 156, pivoting about axis 158 relative to the housing 60 (see FIG. 11). The pivoting movement of the bell crank 152 is further translated to the components of the upper lock assembly by a lock cable 164 attached by a cable pin 166 at one end to the bell crank 152, and the other end is coupled to a linkage system (schematically shown in FIG. 13) which pivots the upper lock pads 228, 230 in and out of engagement with the tubes 54 in the middle leg portion 48.

The geometric relationship of the bell cranks 122, 152, and the lever 116, is such that it significantly multiplies the input force from the operator's hands and creates a force curve that rises and falls with motion. Accordingly, the unlocking effort feels "easier" after the unlocking movement is initiated and moves through about half of its stroke. It will be appreciated by those skilled in the art that this safety feature enhance reliability and facilitates balance of the supported instrument.

More particularly, the lock cable 164 is coupled to links 170, 172 at pivot joint 174 by a ball seat 176. A "ball seat" as referred to herein permits the cable coupled thereto to pivot three-dimensionally. Accordingly, as a vertical force is applied to the bell crank 152 at 154 by the upper lock tube cable 126, the bell crank 152 pivots clockwise as viewed in FIG. 10 to exert a substantially horizontal force at the ball seat 176 to displace the links 170, 172 as shown in phantom in FIG. 13.

Figure 15:
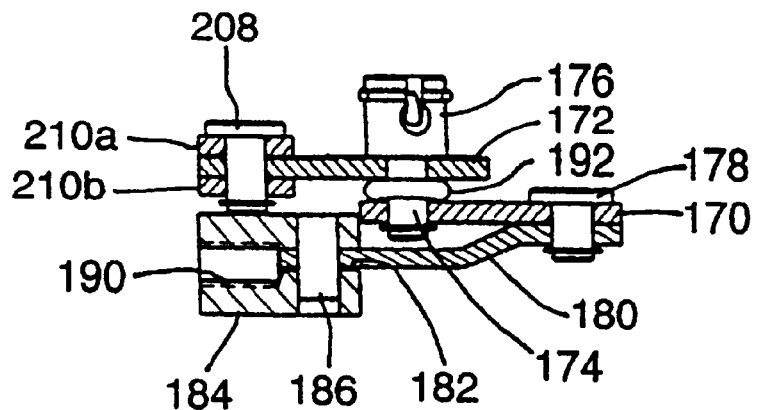
FIG. 15 is a slightly enlarged cross-sectional view taken along line 15—15 in FIG. 14.
Figure 16:
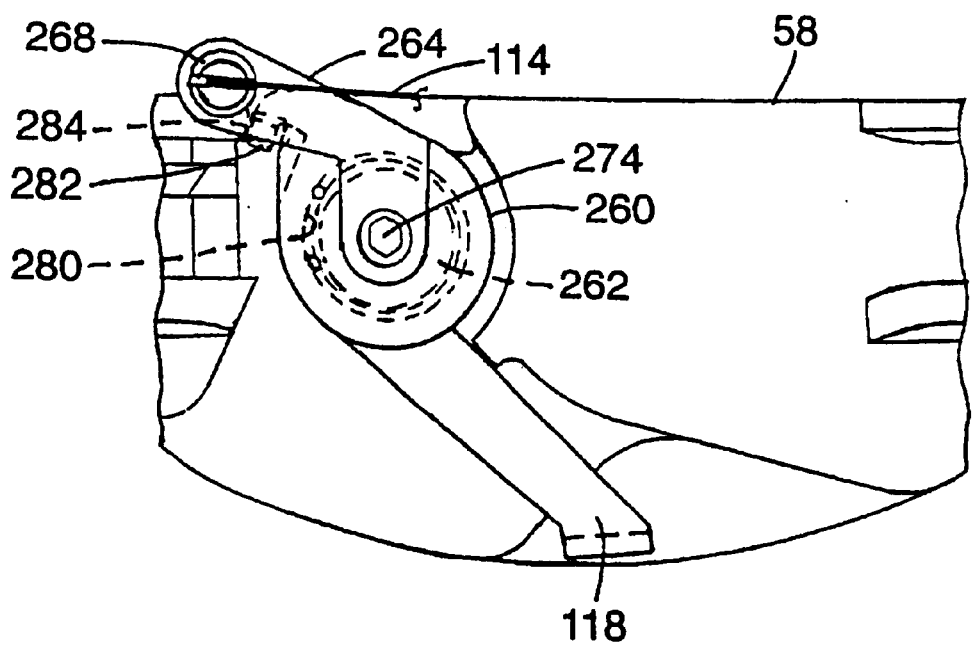
FIG. 16 is a fragmentary plan view of the lower lock actuating mechanism and the upper bracket taken along line 16—16 in FIG. 4.
Figure 17:
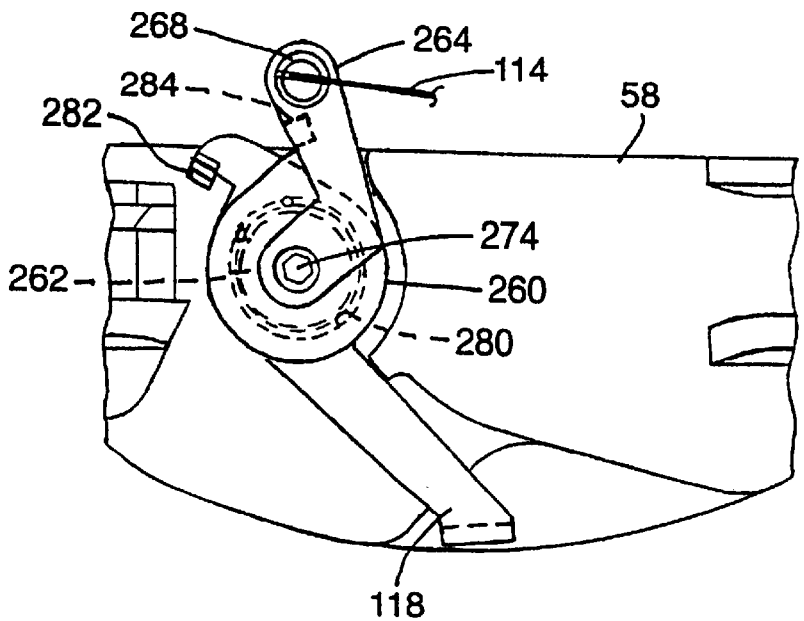
FIG. 17 is a fragmentary plan view similar to FIG. 16 wherein the lower lock crank has been actuated by rotation of the lower lock ring.

As may best be seen in FIG. 15, the link 170 is pivotally coupled to the housing 60 at connecting pin 178 by means of a relatively stationary link 180. The link 180 is secured within an opening 182 in an adjustment block 184 by means of a pair of roll pins 186, 187 (see also FIGS. 11 and 13). In order to provide a means for adjustment of the relative positions of the links 170, 172 of the linkage system 168, and, accordingly, the positions of the upper lock pads 228, 230 relative to the middle tubes 54, a screw 188 (see FIG. 11) is provided along the outer surface of the upper housing 60. The screw 188 is received within a threaded opening 190 in the block 184. In this way, rotation of the screw 188 moves the position of the block 184 within the housing 60, and, accordingly, the location of the link 180 and the pin 178 at the pivot joint of the link 170 (FIG. 15).

Returning now to FIG. 13, while one end of link 172 is pivotally coupled at pivot joint 174, the opposite end is pivotally coupled by connecting pin 208 to transfer link 210. As may be seen in FIGS. 12, 14, and 15, link 210 is comprised of two parallel link elements 210a, 210b which helps to stabilize the movement of the linkage system 168. Transfer link 210 is pivotally coupled to the housing at 212 by pin 214. It will thus be appreciated that the links 170, 172, 210, which are pivotally coupled to the housing at 178 and 212 create a four bar linkage. It will further be appreciated that both ends of link 172, as well as link 172 in its entirety, moves relative to the housing 60 as shown in phantom in FIG. 13.

Figure 11:
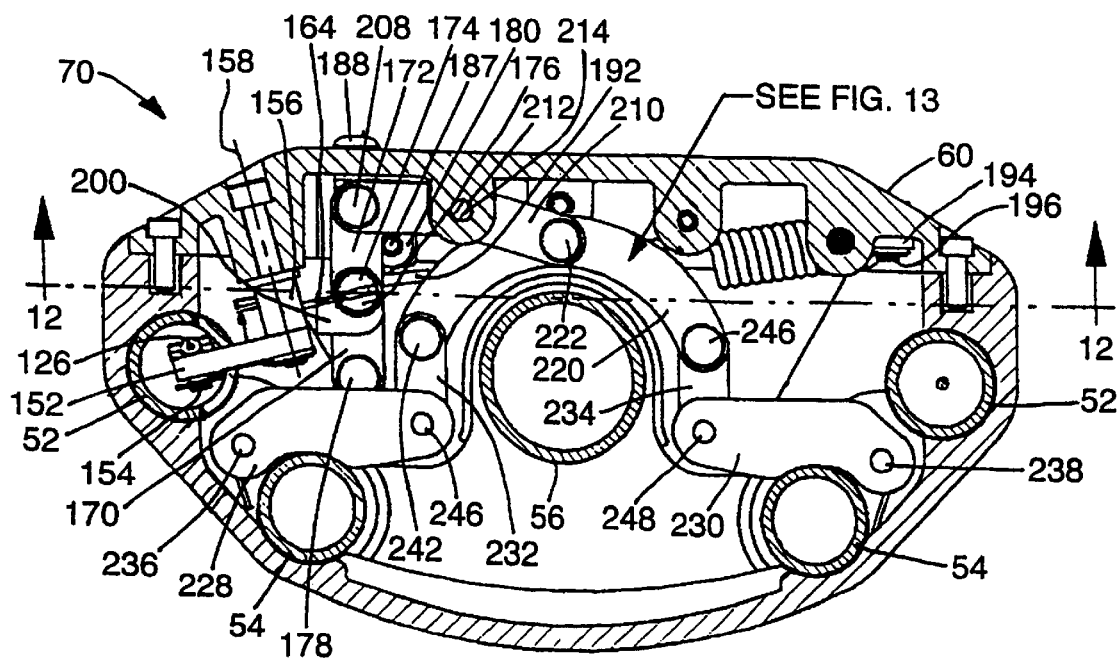
FIG. 11 is a cross-sectional view taken along line 11—11 in FIG. 10 and illustrating the upper lock assembly.
Figure 13:
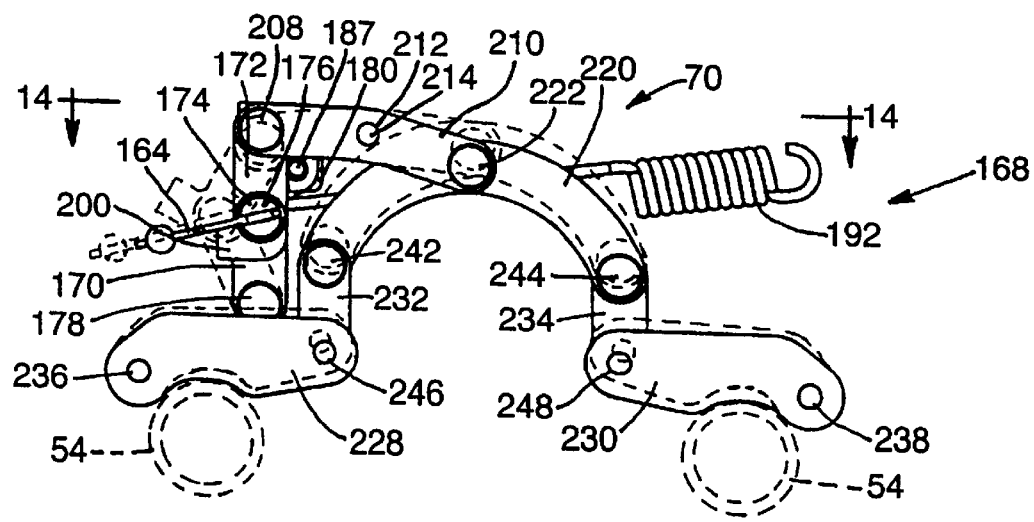
FIG. 13 is a schematic view of the linkage system of the upper lock assembly, illustrating the unlocked position in phantom.
Figure 14:
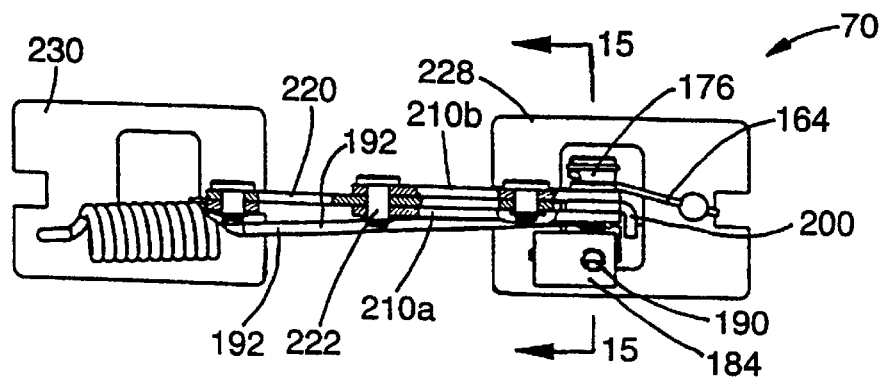
FIG. 14 is a plan view of the linkage system taken along line 14—14 in FIG. 13 and partly broken away at the connections of the upper lock beam.

The opposite end of the transfer link 210 is coupled to an upper lock beam 220 at connecting pin 222. The upper lock beam 220 is arcuately shaped and is disposed about the lower tube 56, which is slidingly disposed within the upper housing 60 (see FIG. 11). The ends of the upper lock beam 220 are coupled to the upper lock pads 228, 230 via lock links 232 and 234. As shown in FIGS. 11 and 13, the upper lock pads 228, 230 are pivotally coupled to the upper housing 60 by means of connecting pins 236, 238, respectively. In this way, the upper lock pads 228, 230 may pivot into or out of engagement with the middle tubes 54 as shown in FIG. 13. The upper lock beam 220 is coupled to the links 232, 234 by connecting pins 242, 246, respectively, which permits the links 220/232 and 220/234 to pivot relative to one another. The link 232 is coupled to the upper lock pad 228 by a connecting pin 246, and the link 234 is coupled to the upper lock pad 230 by a similar connecting pin 248. Accordingly, the links and upper lock pads 232/228 and 234/230 may likewise pivot relative to one another.

During operation, as the user actuates the upper lock upper bell crank 122 from the upper end of the tripod (see FIG. 1), either by rotation of the upper lock ring 100 or actuation of upper release lever 116, the upper lock upper bell crank 122 applies a vertical force to the upper lock tube cable 126 to rotate the upper lock lower bell crank 152. As the upper lock lower bell crank 152 pivots about the coupling pin 156, a force is applied to the lock cable 164 (FIGS. 10 and 11). As shown in FIG. 13, the force of the lock cable 164 moves the links 170, 172 from the in line position to the overcentered position shown in phantom in FIG. 13.

Accordingly, movement of the connecting pin 208 coupling link 172 and the transfer link 210 causes the transfer link 210 to pivot in a counter-clockwise direction. This pivoting of the transfer link 210 moves the upper lock beam 220 and, accordingly, the links 232, 234 in a substantially vertical direction as shown in phantom in FIG. 13. This movement of the links 232, 234, pivots the upper lock pads away from the middle tubes 54 to unlock the upper and middle leg portions 46, 48.

To cause the upper lock pads 228, 230 to once again engage the middle tubes 54 and lock the upper and middle leg portions 46, 48 when the actuating force from the head of the tripod is discontinued, a spring 192 is provided which exerts a restoring force on the linkage system 168. The spring 192 is coupled to pivot joint 174 at one end and to the housing 60 at its other end, as may best be seen in FIG. 12. In this way, the spring 192 urges the links 170, 172 from the overcenter position (shown in phantom in FIG. 13) to the in line position (shown in solid in FIG. 13). In order to ensure that the force of the spring 192 does not move the links 170, 172 beyond the in line position, the link 172 is provided with a downward extending tab 200 (see FIGS. 11, 13, and 14).

Figure 12:
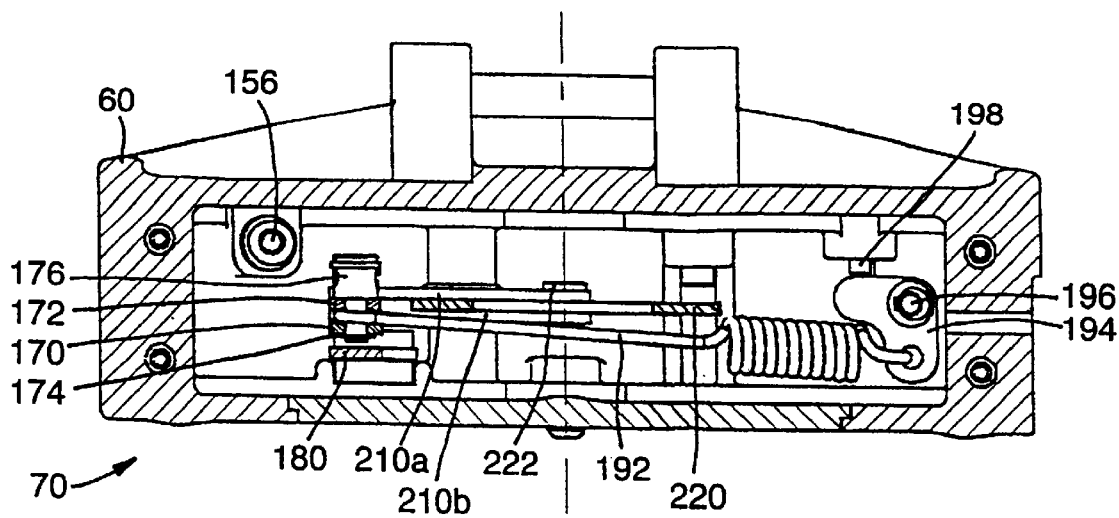
FIG. 12 is a cross-sectional view taken along line 12—12 in FIG. 1

In accordance with another aspect of the invention, the upper lock assembly 70 is likewise adjustable by adjusting the level of restoring force applied by the spring 192. As shown in FIG. 12, the spring 192 is coupled to the upper housing 60 by means of an adjustment link 194. The adjustment link 194 is pivotally coupled to the housing at pivot pin 196. An adjustment screw 198 having a dull end bears against a surface of the adjustment link 194. In this way, by rotating the adjustment screw 198, the pivoted position of the adjustment link 194, and, accordingly, the position of the end of the spring 192 may be adjusted relative to the housing 60 and the linkage system 168.

Turning now to the actuation of the lower lock assembly 72 and returning to FIG. 4, in order to transmit the actuating force or movement from the lower lock ring cable 114 to the lower lock assembly 72, a lower lock crank 260 and torque shaft 270 are provided. The lower lock crank 260 includes a cylindrical portion 262 (partially cross-sectioned in FIG. 4) and an arm 264 extending therefrom. The cylindrical portion 262 is disposed within a bore 266 through the upper surface of the upper bracket 58 such that it may rotate therein. The lower lock cable 114 is coupled to the arm 264 of the lower lock crank 260 by a ball seat 268. In this way, when the user rotates the lower lock ring 102 as shown in FIG. 9, the lower lock cable 114 exerts a force on the ball seat 268 to rotate the lower lock crank 260 within the bore 266 in the upper bracket 58.

In order to transmit this rotational force onward to the lower lock assembly 72, a vertically extending torque shaft 270 is coupled to the crank 260 for axial rotation therewith. The torque shaft 270 is disposed within an opening 272 in the lower surface of the cylindrical portion 262 of the lower lock crank 260 and secured thereto by a bolt 274. As may be seen in FIG. 10, the opposite end of the torque shaft 270 is rotatably coupled to the upper housing 60. In this way, it will be appreciated that the force exerted by the lower lock cable 114 is translated to torque along the torque shaft 270 as the lower lock crank 260 rotates the shaft 270.

Figure 18:
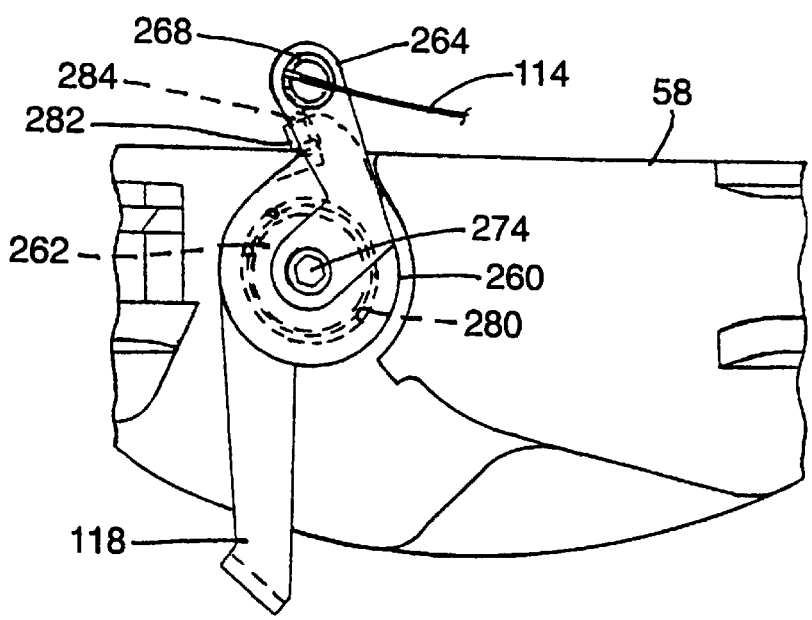
FIG. 18 is a fragmentary plan view similar to FIG. 16 wherein the lower lock crank has been actuated by pivoting he lower lock release lever.

In order to actuate the lower lock assembly 72 of a given leg individually, the lower release lever 118 is coupled to the lower lock crank 260. As shown in FIGS. 4 and 16–18, the lower release lever 118 includes a central opening 280 and is disposed about the cylindrical portion 262 of the lower lock crank 260. The lower release lever 118 further includes an upwardly extending tab 282 which is nested against a vertical surface 284 of the arm 264 of the lower lock crank 260. Accordingly, when the user rotates the upper lock ring 102 to the position shown in FIG. 9, the lower lock crank 260 rotates to the position shown in FIG. 17, and the lower release lever 118 remains in its original position. If, however, the user wishes to actuate the lower lock assembly 72 of an individual leg 40, the user may do so by pivoting the lower release lever 118 outward from the upper bracket 58 to the position shown in FIG. 18. As the release lever 118 pivots, it will be appreciated that the tab 282 engaged against the vertical surface 284 of the lower lock crank 260 pivots the lower lock crank 260 clockwise (as shown in FIG. 18), and, accordingly, rotates the torque shaft 270. When the user pivots the lower release lever 118 back to the position shown in FIG. 16, the lower lock crank 260 is permitted to return to its original position.

In order to transmit the rotational force of the torque shaft 270 forward to the lower lock assembly 72 contained in the lower housing 64, the torque shaft 270 is slidingly disposed within the transfer housing 62. As may be seen in FIG. 19, the transfer housing is secured to the upper ends of the middle tubes 54 and is slidingly disposed about the upper tubes 52. More particularly, as may be seen in FIG. 20, the torque shaft 270 is disposed within a slide crank assembly 290.

According to an important aspect of the invention, the cross-section of the torque shaft 270 is uniform along the portion which engages the slide crank assembly 290 and that cross-section includes a "key," or is other than round. Because the cross-section includes a "key," rotation of the torque shaft 270 about its axis will result in a concomitant rotation or pivoting of the slide crank assembly 290 which is slidably coupled. In the preferred embodiment illustrated, the torque shaft 270 has a square cross-section. It will be appreciated, however, that the torque shaft 270 could have an alternate cross-section so long as it can actuate the slide crank assembly 290. For example, the shaft having an "X," "T," "C," or "L" shaped cross-section could be utilized with an appropriately mating slide crank assembly.

Figure 20:
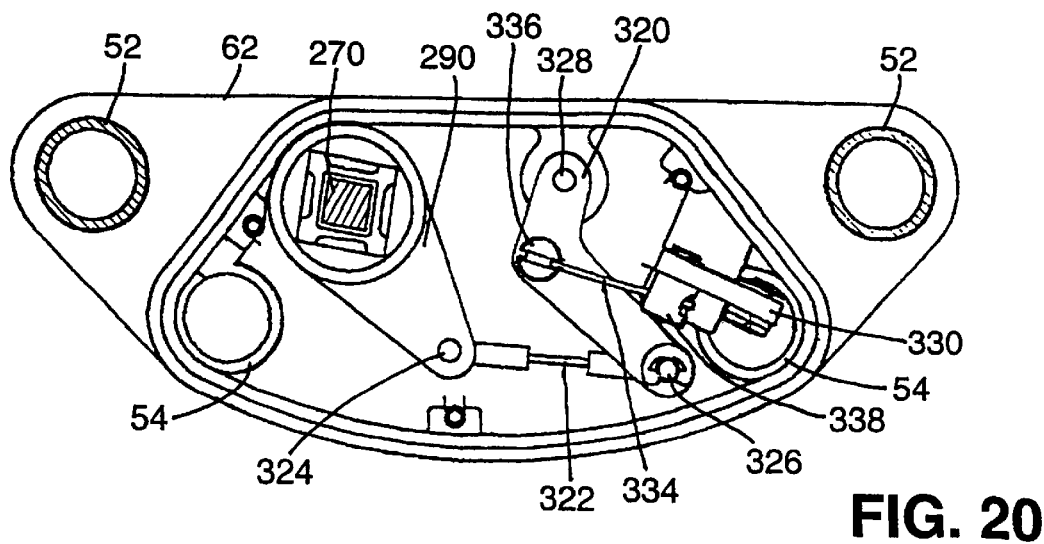
FIG. 20 is a cross-sectional view of the transfer assembly taken along line 20—20 in FIG. 19.
Figure 21:
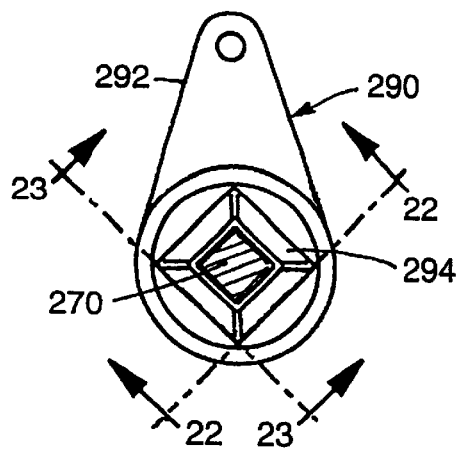
FIG. 21 is a schematic view of the slide crank assembly shown in FIG. 20.
Figure 22:
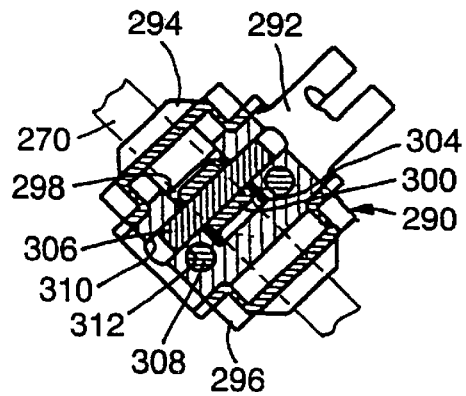
FIG. 22 is a cross-sectional view taken along line 22—22 in FIG. 21.
Figure 23:
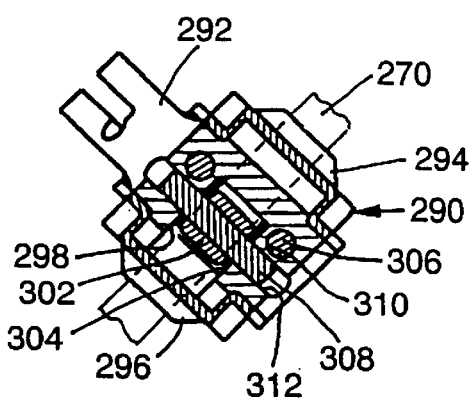
FIG. 23 is a cross-sectional view taken along line 23—23 in FIG. 21.

As the torque shaft 270 rotates, it pivots the slide crank assembly 290 clockwise from the position shown in FIG. 20 to actuate the remaining components of the lower lock transfer system illustrated. It will be appreciated, however, that in addition to pivoting the crank assembly 290, the crank assembly 290 must be slidingly coupled to the torque shaft 270. Such that the torque shaft 270 may continue to exert a rotational force on the slide crank assembly 290 while the slide crank assembly 290 slides along the torque shaft 270.

Figure 24:
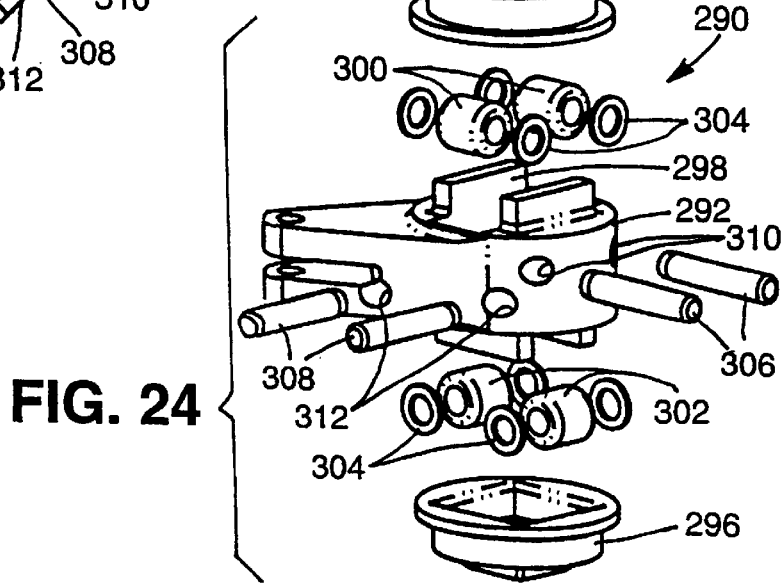
FIG. 24 is an exploded view of the slide crank assembly shown in FIG. 21.

As shown in FIGS. 21–24, the slide crank assembly includes a housing 292 to which end caps 294, 296 are coupled. In order to ensure a smooth sliding movement between the slide crank assembly 290 and the torque shaft 270, pairs of bearings 300, 302 are disposed within the housing 292 along either side of the opening 298 extending therethrough to receive the torque shaft 270. As best seen in FIG. 24, washers 304 are disposed along either side of each bearing 300, 302, and the bearings 300, 302 and washers 304 rotatably coupled to the housing 292 by means of pins 306, 308 disposed in bores 310, 312 extending through the walls of the housing 292. It will thus be appreciated that as the slide crank assembly 290 and torque shaft 270 slide relative to one another, the bearings 300, 302 roll along the surface of the torque shaft 270 to provide a smooth sliding movement.

Returning now to FIG. 20, in order to transmit the rotational force of the torque shaft 270 onward to the lower lock assembly 72, a pair of bell cranks 320, 330 are provided. The slide crank assembly 290 is coupled to the first bell crank 320 by means of a transfer cable 322. The transfer cable 322 is coupled to the slide crank assembly 290 by connecting pin 324 and to bell crank 320 by a ball seat 326. Bell crank 320 is pivotably coupled to the housing 62 at pin 328 such that clockwise pivoting of the slide crank assembly 290 results in a corresponding clockwise pivoting of the bell crank 320 about pin 328.

Figure 19:
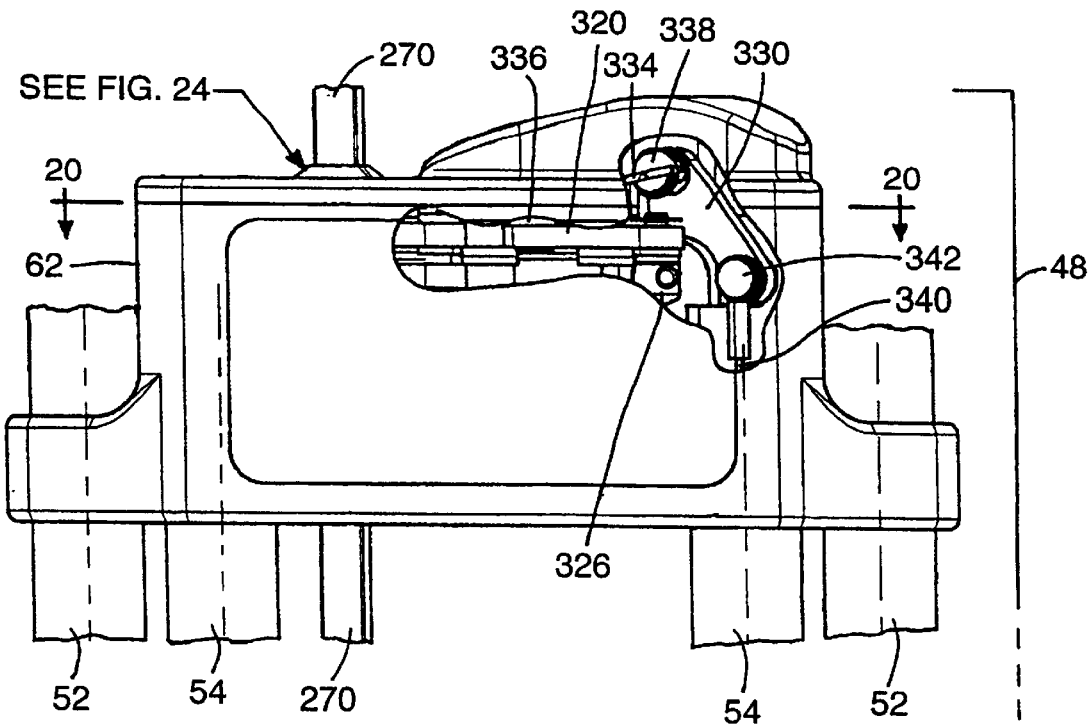
FIG. 19 is a plan view of the transfer housing partially broken away to show the transfer bell crank.
Figure 19A:
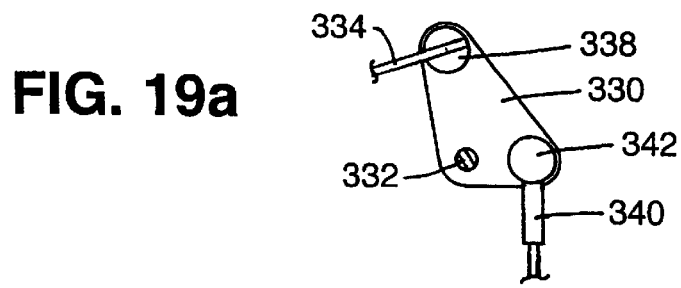
FIG. 19a is a plan view of the lower lock lower bell crank.

As may be seen by comparison of FIGS. 19 and 20, the bell cranks 320, 330 are substantially perpendicular. The bell crank 330 is pivotably coupled to the transfer housing 62 at pin 332. Movement of the horizontal transfer bell crank 320 is transmitted to the vertical transfer bell crank 330 by means of a second transfer cable 334, which is coupled to the horizontal transfer bell crank 320 at ball seat 336 and to the vertical transfer bell crank 330 by ball seat 338. Accordingly, as the horizontal bell crank 320 pivots in a clockwise direction (as shown in FIG. 20), the force exerted on the transfer cable 334 causes the vertical bell crank 330 to pivot in a counter-clockwise position (as viewed in FIG. 19). The pivoting motion of the vertical transfer bell crank 330 is further transmitted to the lower lock assembly 72 by means of a lower lock tube cable 340 which extends downward through the middle tube 54. The lower lock tube cable 340 is coupled to the vertical transfer bell crank 330 by connecting pin 342.

It will be appreciated that, as with the upper lock assembly, the geometric relationship of the bell cranks 320, 330, and the slide crank assembly 290 is such that it significantly multiplies the input force from the operator's hands and creates a force curve that rises and falls with motion. As a result, the unlocking effort feels "easier" after initiation and after moving through about half of the stroke. As with the upper lock assembly, this acts as a safety feature.

Accordingly, during operation, when a user rotates the lower lock ring 102 or actuates the lower lock release lever 118 from the upper end of the tripod 30, to rotate the torque shaft 270, the slide crank assembly 290 pivots in a clockwise direction to pivot the horizontal transfer bell crank 320 in a clockwise direction (as viewed in FIG. 20) and the vertical transfer bell crank 330 in a counter-clockwise direction (as viewed in FIG. 19) to transmit a vertical actuating force to the lower lock assembly 72 by means of the lower lock tube cable 340 to unlock the lower lock assembly 72. It will be appreciated that so long as the upper and middle leg portions 46, 48 are not locked together, the slide crank assembly 290 and the torque shaft 270 are free to slide relative to one another.

Figure 25:
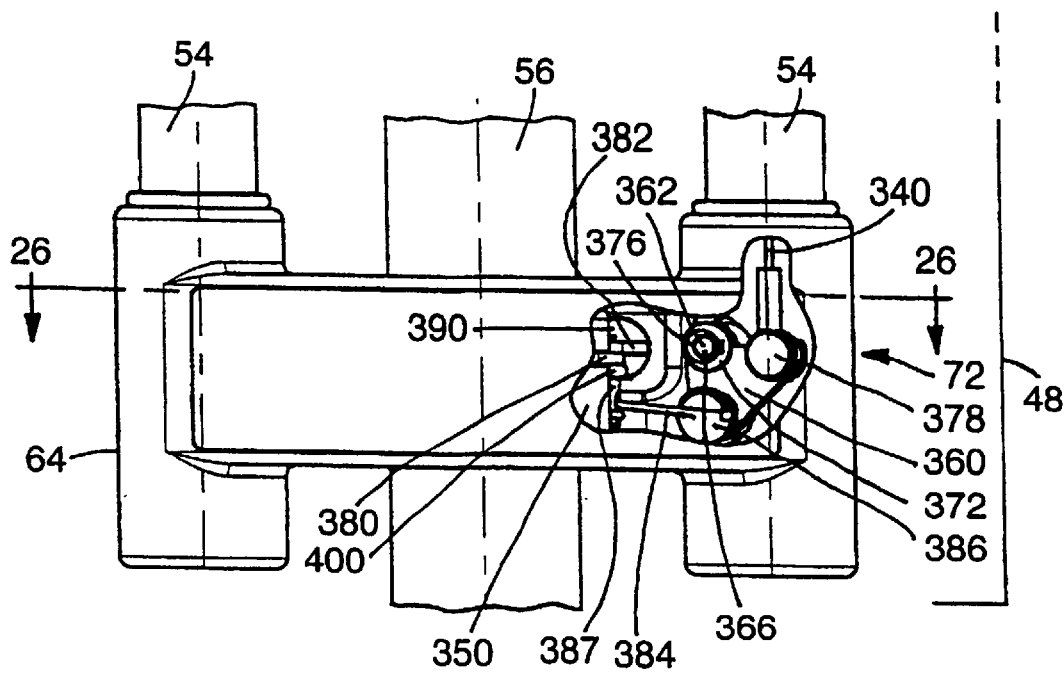
FIG. 25 is a plan view of the lower housing partially broken away to show the lower lock lower bell crank.
Figure 26:
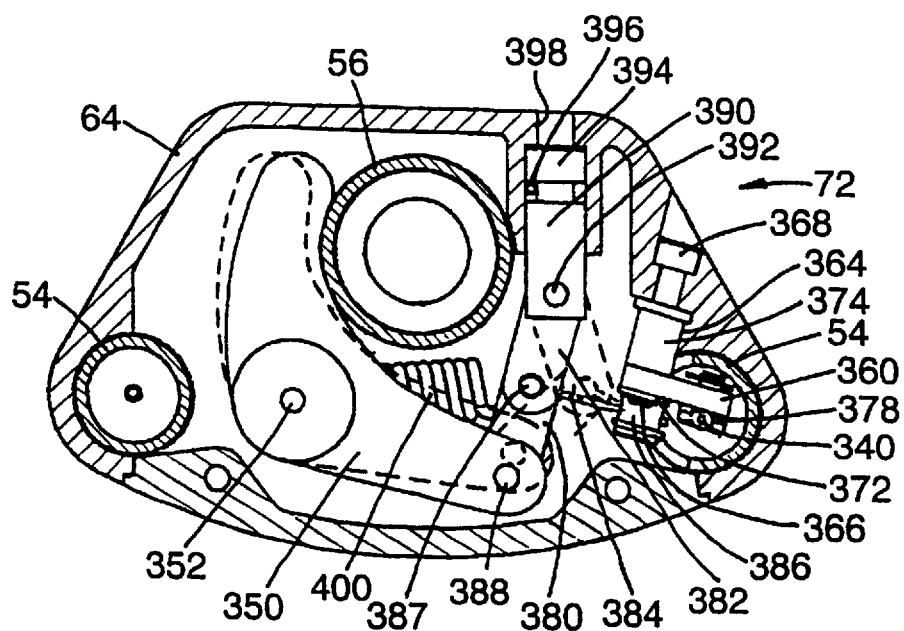
FIG. 26 is a cross-sectional view of the lower lock assembly taken long line 26—26 in FIG. 25.

Turning now to the structure and operation of the lower lock assembly 72, there is shown in FIGS. 25 and 26 the lower housing 64 which houses the lower lock assembly 72. The lower housing is secured to the lower end of the middle tubes 54 and slidingly coupled with the lower tube 56. As may be seen in FIG. 26, the middle and lower tubes 54, 56 may be locked together by means of a lower lock pad 350 which is secured to the lower housing 64 at pivot joint 352. It will be appreciated that when the lower lock pad 350 is in the position shown in solid lines in FIG. 26, the lower lock pad 350 secures the lower lock housing 64, and, accordingly, the middle tubes 54 to the lower tube 56 to prevent the tubes from sliding relative to one another. Alternately, when the lower lock pad is pivoted to the position shown in phantom in FIG. 26, the lower tube 56 is free to slide relative to the lower housing 64 to permit adjustment of the relative positions of the middle and lower leg portions 48, 50. In order to transmit the vertical force of the lower lock tube cable 340 to pivot the lower lock pad 350 out of engagement with the lower tube 56, a lower bell crank 360 and a pair of links 380, 382 are provided.

The lower bell crank 360 is pivotably coupled to the lower housing 64 at pivot point 362 by a support post assembly 364. The support post assembly 364 includes a post 366 coupled to the housing 64 by a bolt 368. A washer 372 and tube 374 are disposed about the crank 360, the tube 374 spacing the crank 360 from the wall of the housing 64. The lower bell crank is secured to the post 366 by a snap ring 376.

The lower tube cable 340 is coupled to the bell crank 360 by a connecting pin 378 such that as a vertical force is applied to the bell crank 360 by the tube cable 340, the bell crank 360 pivots counter-clockwise as viewed in FIG. 25. This force is further transmitted to the lock links 380, 382 by a lower lock cable 384. The lock cable 384 is coupled to the bell crank 360 by a ball seat 386. The lock cable 384 is similarly coupled to the pivot joint of links 380, 382 by a ball seat 387.

The end of link 380 opposite the ball seat 386 (FIG. 26) is pivotably coupled to the lower lock pad 350 by a connecting pin 388, while the opposite end of link 382 is pivotably coupled to the lower housing 64. In order to provide a means by which the link 382 may be adjusted relative to the housing 64, the link 382 is coupled to the housing by means of an adjustment link 390. Those skilled in the art will appreciate that by adjusting the position of the link 382 within the housing 674, the user ultimately adjusts the position of the lower lock pad 350 relative to the lower tube 56. The links 382, 390 are pivotably coupled by a dowel pin 392. A bolt 394, the head of which is accessible through an opening 398 in the housing 64, threads into the link 290. The bolt 394 is held in position within the housing 64 by a roll pin 396. Accordingly, the user may rotate the bolt 394 relative to the housing 64 and link 390 to adjust the position of the link 390 and, accordingly, the link 382, relative to the housing 64.

During operation, as the lower bell crank 360 pivots, the lock cable 384 exerts a force at the ball seat 387 to pivot the links 380, 382 to the position shown in phantom in FIG. 26. This movement of the link 380 pivots the lower lock pad 350 to the position shown in phantom in FIG. 26, unlocking the lower housing and, accordingly, the middle tubes 54, from the lower tube 56.

In order to restore the lower lock assembly 72 to the locked position shown in solid lines in FIG. 26, there is provided a spring 400. The spring 400 is coupled at one end to the housing 64 at pivot joint 352. The opposite end of the spring is coupled to the pivot joint of the links 380, 382 at the ball seat 386. In this way, as the force applied at the tube cable 340, and, accordingly, the lock cable 384, is discontinued (as by the user rotating the lower lock ring 102 to its original position or by pivoting the lower release lever 118 to its original position), the spring 400 exerts a restoring force to return the links 380, 382 to their original in line position, pivoting the lower lock pad 350 back into locked engagement with the lower leg 56.

It will be appreciated that a tripod leg constructed in accordance with the teachings of the invention may incorporate alternate lock assemblies for securing together portions of the tripod leg. By way of example only, the leg may include interlocking teeth, such as illustrated in U.S. Pat. Nos. 4,840,338 and 4,872,627, which are incorporated herein by reference.

Figure 27:
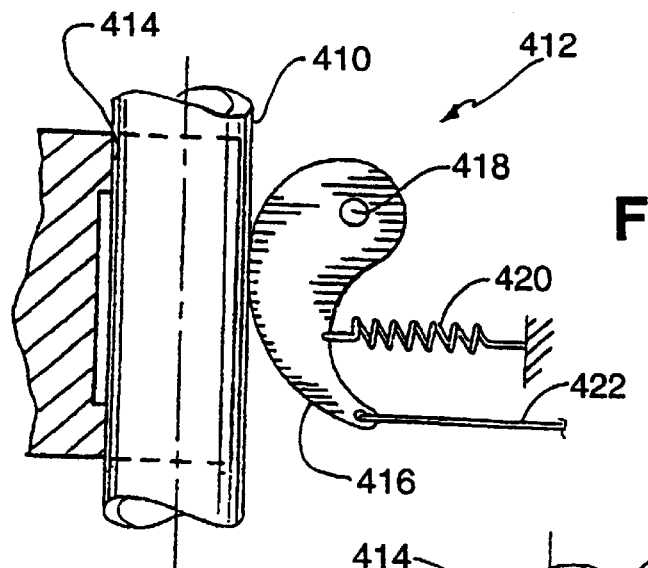
FIG. 27 is a fragmentary, partial side cross-sectional view of an alternate embodiment of a locking assembly and a section of a tripod leg, the locking assembly being shown in the locked position.
Figure 28:
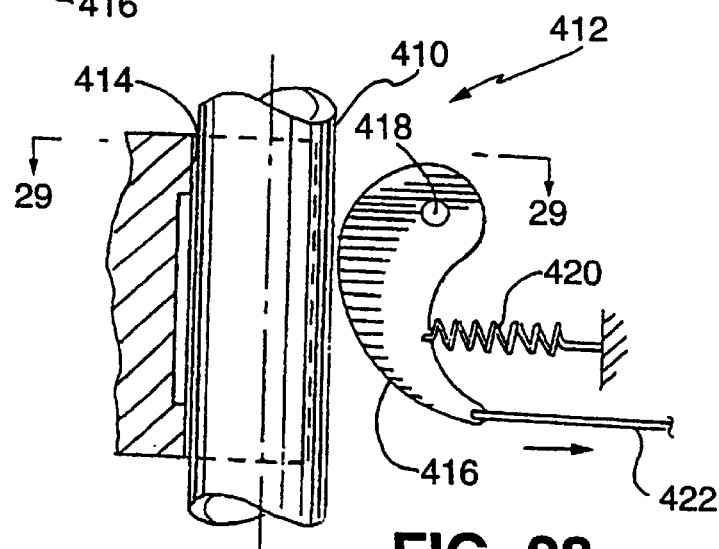
FIG. 28 is a fragmentary, partial side cross-sectional view similar to that shown in FIG. 27 wherein the locking assembly is in an unlocked position.
Figure 29:
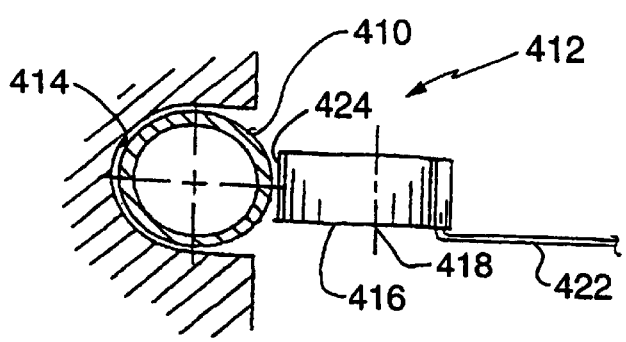
FIG. 29 is a cross-sectional view of the locking assembly and tripod leg taken along line 29—29 in FIG. 28.

A further alternate embodiment of a lock assembly is shown in FIGS. 27–29. In this embodiment, a segment of a first leg portion 410 is slidably disposed within a lock assembly 412 secured to a second leg portion (not illustrated). The lock assembly comprises a first pad or bearing surface 414, and a second pad or cam 416 disposed opposite the bearing surface 414. As shown in FIG. 27, when the cam 416 is in engagement with the first leg portion 410, the first leg portion 410 is sandwiched and clamped between the cam 416 and the bearing surface 414. When the cam 416 is pivoted about axis 418 into the disengaged position shown in FIG. 28, the first leg portion is in a free slide between the cam 416 and bearing surface 414 to extend or compress the leg.

The cam 416 is preferably in the form of a nautilus-shape. In this way, as the first leg portion 410 asserts an upward force along the engagement surface between the cam 416 and the leg portion 410, the cam 416 tends to rotate in a clockwise direction about axis 418 as illustrated. As a result, the retaining or compression force asserted by cam 416 increases as the first leg portion 410 attempts to move upward relative to the locking assembly. It will further be appreciated that the surface of the tripod leg adjacent to the lock cam 416 may be roughed or provided with teeth in order to more effectively engage the locking mechanism.

In order to advance the cam 416 into engagement with the first leg portion 410, the cam 416 is spring biased, preferably by a compression spring 420. It will be appreciated, however, that alternate biasing structure may be provided. To disengage the cam 416 from the leg portion 410, a cable 422, similar to actuating cables 164 or 384, is provided.

Figure 30:
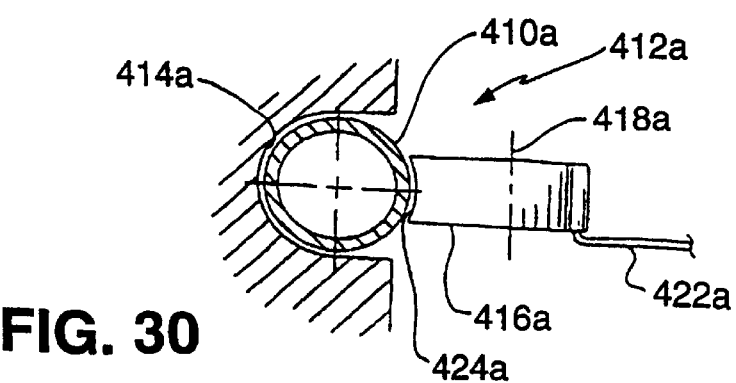
FIG. 30 is a cross-sectional view of a second alternate embodiment of the locking assembly and tripod leg similar to the view shown in FIG. 29.

As shown in FIG. 29, the surface 424 of the cam 416 may be relatively flat. Alternately, the surface 424a may be convex as shown in FIG. 30 or conform to the shape of the leg portion 410a to provide increased contact area.

In summary, a tripod utilizing dual stage legs constructed in accordance with teachings of the invention may be easily and quickly set up to support a camera. The user positions as desired the camera supported on the head, then rotates the upper and lower lock rings to release the upper and lower lock assemblies. The legs of the tripod then telescope to the ground under the force of gravity. When the lock rings are returned to their original position, the upper and lower lock assemblies again lock the upper, middle, and lower lock rings in the telescoped position. The user may then adjust the individual legs as desired by actuating the corresponding leg lock assemblies.

I claim as my invention:

1. A telescoping leg assembly for supporting a head comprising, in combination, an elongated upper leg portion adapted to be secured to the head at its upper end, an elongated middle leg portion having an upper end and a lower end, the upper and middle leg portions being slidably coupled for telescoping relative movement over a middle leg adjustment range, an elongated lower leg portion, the middle and lower leg portions being slidably coupled for telescoping relative movement, a lower lock assembly for releasably securing the middle leg portion and the lower leg portion, an actuation mechanism for actuating the lower lock assembly from the upper end of the upper leg portion, said actuation mechanism including an elongated torque shaft having an upper end and a lower end and having an axis disposed substantially parallel the upper leg portion, said torque shaft having a uniform cross section over the middle leg adjustment range, said shaft cross section having an actuation key, a crank for selectively rotating the torque shaft about its axis, said crank being disposed substantially adjacent the upper end of the upper leg portion, a transfer support secured to the upper end of the middle leg portion, said transfer support having a passage therethrough for slidably receiving the torque shaft as the middle leg portion and the transfer support move relative to the upper leg portion, a slide crank disposed within the transfer support engaging the actuation key of the torque shaft such that rotation of the torque shaft about its axis pivots the slide crank, said slide crank being coupled to the lower lock assembly whereby pivotal movement of the slide crank actuates said lower lock assembly.

2. The leg assembly of claim 1 wherein said lower lock assembly is secured to the lower end of the middle leg portion, and the actuation mechanism further comprises a cable coupled to the slide crank for movement therewith, the cable extending from the upper end of the middle leg portion to the lower end of the middle leg portion, the cable transmitting pivoting movement of the slide crank to the lower end of the middle leg portion to actuate the lower leg lock.

3. The leg assembly of claim 1 wherein the lower lock assembly is secured to the lower end of the middle leg portion, and the lower lock includes a lower lock pad disposed adjacent the lower leg portion for selective engagement therewith to prevent movement between the lower leg portion and the middle leg portion, the slide crank being coupled to the lower lock pad such that pivoting movement of the slide crank selectively engages and disengages the lower lock pad from the lower leg portion.

4. The leg assembly of claim 1 wherein the torque shaft has a rectangular cross-section over the middle leg adjustment range, the rectangular cross-section having edges which define the actuation key.

5. The leg assembly of claim 1 wherein the slide crank includes bearings disposed adjacent the torque shaft.

6. The leg assembly of claim 4 wherein the slide crank includes bearings disposed adjacent the torque shaft.

7. The leg assembly claim 6 wherein the slide crank is disposed about the torque shaft and the slide crank includes two pairs of bearings disposed along opposite sides of the torque shaft.

8. The leg assembly claim 1 wherein the crank includes an arm which extends outward from the crank such that a force applied to the arm rotates the torque shaft.

9. The leg assembly claim 1 wherein the means for actuating further includes a lever coupled to the crank.

10. The leg assembly of claim 1 further including an upper lock assembly for releasably securing the upper leg portion and the middle leg portion.

11. The leg assembly of claim 10 further including a second actuation mechanism for actuating the upper lock assembly from the upper end of the upper leg portion.

12. The leg assembly of claim 11 wherein the upper leg portion includes a lower end, said upper lock assembly being secured to the lower end of the upper leg portion, and wherein the upper lock actuation mechanism includes a bell crank pivotably coupled to the upper leg portion and a cable coupled to the bell crank for movement therewith, the cable extending from the upper end of the upper leg portion to the lower end of the upper leg portion, the cable transmitting pivoting movement of the bell crank to the lower end of the upper leg portion to actuate the upper leg lock.

13. A leg for a tripod comprising, in combination, an elongated upper leg portion having an upper end and a lower end and being adapted to be secured to a tripod head at its upper end, an upper housing guide secured to the lower end of said upper leg portion and having an upper housing guide passage, a middle leg portion having a uniform cross section through a middle leg adjustment range, said upper housing guide passage closely receiving said middle leg uniform cross section in sliding relationship so that said upper and middle leg portions can slide longitudinally and adjust the total leg length, an upper lock assembly for releasably securing the upper and middle leg portions together to prevent relative sliding movement, a lower housing guide secured to the lower end of said middle leg portion and having a lower housing guide passage, a lower leg portion having a uniform cross section through a lower leg adjustment range, said lower housing guide passage closely receiving said lower leg uniform cross section in sliding relationship so that said middle and lower leg portions can slide longitudinally and adjust the total leg length, a lower lock assembly for releasably securing the middle and lower leg portions together to prevent relative sliding movement, an actuation mechanism for actuating the lower lock assembly from the upper end of the upper leg portion, said actuation mechanism including an elongated torque shaft having an upper end and a lower end and having an axis disposed substantially parallel the upper leg portion, said torque shaft having a uniform cross section over a middle leg portion adjustment range, said shaft cross section having an actuation key, a crank for rotating the torque shaft about its axis, said crank being disposed substantially adjacent the upper end of the torque shaft, a transfer housing secured to the upper end of the middle leg portion, said transfer housing having a passage therethrough for slidably receiving the torque shaft as the middle leg portion and the transfer housing move relative to the upper leg portion, a slide crank disposed within the transfer housing engaging the actuation key of the torque shaft such that rotation of the torque shaft about its axis pivots the slide crank, said slide crank being coupled to the lower lock assembly whereby pivotal movement of the slide crank actuates said lower lock assembly.

14. The leg of claim 13 wherein said lower lock assembly is disposed within the lower housing guide, and the actuation mechanism for actuating the lower lock assembly further comprises a cable coupled to the slide crank for movement therewith, the cable extending from the upper end of the middle leg portion to the lower end of the middle leg portion, the cable transmitting pivoting movement of the slide crank to the lower end of the middle leg portion to actuate the lower leg lock.

15. The leg of claim 13 wherein the lower lock assembly is secured to the lower housing guide, and the lower lock includes a lower lock pad disposed adjacent the lower leg portion for selective engagement therewith to prevent movement between the lower leg portion and the middle leg portion, the slide crank being coupled to the lower lock pad such that pivoting movement of the slide crank selectively engages and disengages the lower lock pad from the lower leg portion.

16. The leg of claim 13 wherein the torque shaft has a rectangular cross-section over the middle leg adjustment range, the rectangular cross-section having edges which define the actuation key.

17. The leg of claim 13 wherein the slide crank includes bearings disposed adjacent the torque shaft.

18. The leg of claim 16 wherein the slide crank includes bearings disposed adjacent the torque shaft.

19. The leg of claim 18 wherein the slide crank is disposed about the torque shaft and the slide crank includes two pairs of bearings disposed along opposite sides of the torque shaft.

20. The leg of claim 13 further including a second actuation mechanism for actuating the upper lock assembly from the upper end of the upper leg portion.

21. The leg of claim 20 wherein the upper lock assembly is disposed within the upper housing guide, and the second actuation mechanism includes a bell crank pivotably coupled to the upper leg portion and a cable coupled to the bell crank for movement therewith, the cable extending from the upper end of the upper leg portion to the lower end of the upper leg portion, the cable transmitting pivoting movement of the bell crank to the upper housing guide to actuate the upper leg lock.

22. A tripod comprising, in combination, a tripod head, three elongated leg assemblies coupled at their upper ends to said head, each said leg assembly having an upper leg portion, a middle leg portion slidably coupled to the upper leg portion for selectively extending the length of the leg assembly over a middle leg adjustment range, a lower leg portion slidably coupled to the middle leg portion for selectively extending the length of the leg assembly over a lower leg adjustment range, an upper lock assembly for releasably securing the associated middle and upper leg portions together to prevent relative movement therebetween, a lower lock assembly for releasably securing the associated lower and middle leg portions together to prevent relative movement therebetween, an actuation mechanism for actuating the lower lock assembly in at least one of the leg assemblies from the upper end of said leg assembly, said actuation mechanism including an elongated torque shaft having an upper end and a lower end and having an axis disposed substantially parallel the upper leg portion of said leg, said torque shaft having a uniform cross section over the middle leg adjustment range, said shaft cross section having an actuation key, a crank for rotating the torque shaft about its axis, said crank being disposed substantially adjacent the upper end of the upper leg portion of said leg such that pivoting the crank rotates the torque shaft about its axis, a transfer support secured to the upper end of the middle leg portion, said transfer support having a passage therethrough for slidably receiving the torque shaft as the middle leg portion and the transfer support move relative to the upper leg portion, a slide crank disposed within the transfer housing engaging the actuation key of the torque shaft such that rotation of the torque shaft about its axis pivots the slide crank, said slide crank being coupled to the lower lock assembly whereby pivotal movement of the slide crank actuates said lower lock assembly.

23. The tripod of claim 22 wherein the at least one leg further comprises a second actuation mechanism for actuating the upper lock assembly from the upper end of the leg assembly.

24. The tripod of claim 22 wherein each of the legs includes said actuation mechanism for actuating the lower lock assembly, the tripod further including a lower lock actuation element disposed substantially adjacent the head and coupled to the crank of each leg whereby actuation of the lower lock actuation element pivots the crank to actuate the lower lock assembly of each leg substantially simultaneously.

25. The tripod of claim 24 wherein the actuation element comprises a lower lock ring disposed subjacent the head, the lower lock ring being coupled to the crank of each leg by a cable such that rotation of the lower lock ring pivots the crank of each leg to actuate the lower lock assembly of each leg substantially simultaneously.

26. The tripod of claim 24 wherein each leg comprises a lever for pivoting the crank to actuate the lower lock assembly of the associated leg individually.

27. The tripod of claim 24 wherein the upper lock assembly of each leg is secured to the lower end of the upper leg portion of each leg, and each leg assembly including a second actuation mechanism for actuating the upper lock assembly of the associated leg from the upper end of the upper leg portion.

28. The tripod of claim 27 wherein each said second actuation mechanism includes a bell crank pivotably coupled to the upper leg portion and a cable coupled to the bell crank for movement therewith, the cable extending from the upper end to the lower end of the upper leg portion to transmit pivoting movement of the bell crank to actuate the upper lock assembly.

29. The tripod of claim 28 further including an upper lock actuation element disposed substantially adjacent the head and coupled to the bell crank of each leg whereby actuation of the upper lock actuation element pivots the bell crank to actuate the upper lock assembly of each leg substantially simultaneously.

30. The tripod of claim 25 wherein each said leg assembly includes a second actuation mechanism for actuating the upper lock assembly of the associated leg from the upper end of the upper leg portion, each said second actuation mechanism including a bell crank pivotably coupled to the upper leg portion and a cable coupled to the bell crank for movement therewith, the cable extending from the upper end to the lower end of the upper leg portion to transmit pivoting movement of the bell crank to actuate the upper lock assembly, the tripod further including an upper lock ring disposed subjacent the head, the upper lock ring being coupled to the bell crank of each leg by a cable such that rotation of the upper lock ring pivots the bell crank of each leg to actuate the upper lock assembly of each leg substantially simultaneously.

31. The tripod of claim 22 wherein at least one said leg assembly includes a substantially cone-shaped surface and the tripod head includes a substantially cone-shaped surface disposed substantially adjacent the cone-shaped surface of the at least one said leg assembly, one of said cone-shaped surfaces being convex, the other of said cone-shaped surfaces being concave, and the tripod further comprises a coupling extending through said cone-shaped surfaces.

32. The leg assembly of claim 1 wherein the transfer support comprises a housing.

* * * * *